US011379184B2

(12) United States Patent
Edmonds et al.

(10) Patent No.: US 11,379,184 B2
(45) Date of Patent: *Jul. 5, 2022

(54) REFINEMENT OF VOICE QUERY INTERPRETATION

(71) Applicant: Spotify AB, Stockholm (SE)

(72) Inventors: Philip Glenny Edmonds, Arlington, MA (US); Matthew Joseph Kane, Salem, MA (US); Joshua Pham, Cambridge, MA (US); Eder G. Bastos, Natick, MA (US); Marcus Daniel Better, Arlington, MA (US); Adithya Kalyan Tammavarapu, Medford, MA (US); Amilcar Andrade Garcia, Boston, MA (US); Chen Ye Li, Cambridge, MA (US); Adam Jonathan Shonkoff, Reading, MA (US); Aaron Paul Harmon, Port Washington, NY (US); Christopher Phair, North Reading, MA (US); Ching Chuan Sung, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,387

(22) Filed: Apr. 12, 2021

(65) Prior Publication Data

US 2021/0232362 A1 Jul. 29, 2021

Related U.S. Application Data

(63) Continuation of application No. 16/421,590, filed on May 24, 2019, now Pat. No. 11,003,419.

(Continued)

(51) Int. Cl.
*G06F 3/16* (2006.01)
*G06F 16/435* (2019.01)
(Continued)

(52) U.S. Cl.
CPC ............ *G06F 3/167* (2013.01); *G06F 3/0482* (2013.01); *G06F 16/433* (2019.01); *G06F 16/435* (2019.01); *G06F 16/438* (2019.01)

(58) Field of Classification Search
CPC ...... G06F 3/167; G06F 16/435; G06F 16/438; G06F 16/433; G06F 3/0482
See application file for complete search history.

(56) References Cited

U.S. PATENT DOCUMENTS 7,577,910 B1 8/2009 Husemann et al.
8,224,654 B1 7/2012 LeBeau
(Continued)

FOREIGN PATENT DOCUMENTS

EP 3454227 A1 3/2019

OTHER PUBLICATIONS

Naik et al., "Context Aware Conversational Understanding for Intelligent Agents with a Screen," Thirty-Second AAAI Conference on Artificial Intelligence, 2018.
(Continued)

*Primary Examiner* — Shen Shiau
(74) *Attorney, Agent, or Firm* — Merchant & Gould P.C.

(57) ABSTRACT

A system for refinement of a voice query interpretation interprets a voice query received at a voice-enabled device to identify commands responsive to the voice query for execution at the voice-enabled device, and enables refinement of the interpretation of the voice query through a graphical user interface generated and displayed at a GUI-capable device. The graphical user interface includes a set of selectable options relating to the voice query and identifying a refinement of the interpretation of the voice query to enable control and/or adjustment of commands to be executed by the voice-enabled device. For example, if one of the selectable options is selected, then a command associ-
(Continued)

ated with the selected option is identified and executed by the voice-enabled device.

20 Claims, 13 Drawing Sheets

Related U.S. Application Data

(60) Provisional application No. 62/820,691, filed on Mar. 19, 2019.

(51) Int. Cl.
*G06F 16/438* (2019.01)
*G06F 16/432* (2019.01)
*G06F 3/0482* (2013.01)

(56) References Cited

U.S. PATENT DOCUMENTS

| | | | |
|---|---|---|---|
| 8,249,876 B1 | 8/2012 | Ainslie | |
| 9,898,250 B1 | 2/2018 | Williams | |
| 10,056,078 B1 | 8/2018 | Shepherd | |
| 10,068,573 B1 | 9/2018 | Aykac | |
| 10,296,194 B2* | 5/2019 | McLean | G06F 3/0488 |
| 10,425,780 B1 | 9/2019 | Devaraj | |
| 10,425,781 B1 | 9/2019 | Devaraj | |
| 10,448,115 B1 | 10/2019 | Jamal | |
| 10,496,705 B1* | 12/2019 | Irani | G06F 16/90332 |
| 10,720,157 B1 | 7/2020 | Kapila | |
| 10,748,546 B2* | 8/2020 | Kim | G10L 15/30 |
| 10,885,091 B1* | 1/2021 | Meng | G06F 16/433 |
| 10,942,702 B2* | 3/2021 | Piersol | G10L 15/30 |
| 10,978,062 B1* | 4/2021 | Vanderschaegen | H04N 21/47217 |
| 10,984,798 B2* | 4/2021 | Schramm | H04M 3/42212 |
| 11,003,419 B2* | 5/2021 | Edmonds | G06F 3/167 |
| 2007/0291404 A1* | 12/2007 | Morse | G11B 27/105 360/81 |
| 2009/0150156 A1 | 6/2009 | Kennewick et al. | |
| 2011/0184730 A1* | 7/2011 | LeBeau | G10L 15/30 704/235 |
| 2015/0089075 A1* | 3/2015 | Strigeus | G06F 16/2228 709/231 |
| 2015/0269175 A1 | 9/2015 | Espenshade et al. | |
| 2015/0279356 A1 | 10/2015 | Lee | |
| 2015/0382047 A1 | 12/2015 | Van Os et al. | |
| 2017/0068423 A1 | 3/2017 | Napolitano et al. | |
| 2017/0236512 A1 | 8/2017 | Williams | |
| 2017/0329573 A1 | 11/2017 | Mixter | |
| 2017/0352350 A1 | 12/2017 | Booker et al. | |
| 2018/0182380 A1 | 6/2018 | Fritz | |
| 2018/0190264 A1* | 7/2018 | Mixter | G06F 3/167 |
| 2018/0190287 A1 | 7/2018 | Jarosz et al. | |
| 2018/0286403 A1 | 10/2018 | Gruber | |
| 2018/0308483 A1 | 10/2018 | Myoung | |
| 2018/0322870 A1 | 11/2018 | Lee | |
| 2018/0330589 A1 | 11/2018 | Horling | |
| 2018/0336275 A1 | 11/2018 | Graham et al. | |
| 2018/0338038 A1 | 11/2018 | Ly | |
| 2019/0066670 A1 | 2/2019 | White | |
| 2019/0103848 A1 | 4/2019 | Shaya | |
| 2019/0132436 A1 | 5/2019 | Jang | |
| 2019/0147862 A1 | 5/2019 | Lu | |
| 2019/0147864 A1 | 5/2019 | Lu | |
| 2019/0340200 A1 | 11/2019 | Coimbra | |
| 2019/0341040 A1 | 11/2019 | Kirazci | |
| 2019/0362715 A1 | 11/2019 | Aggarwal | |
| 2019/0371315 A1* | 12/2019 | Newendorp | G10L 15/22 |
| 2019/0371331 A1 | 12/2019 | Schramm | |
| 2020/0026488 A1 | 1/2020 | Yoon | |
| 2020/0051558 A1 | 2/2020 | Yeon | |
| 2020/0125319 A1 | 4/2020 | Kim | |
| 2020/0184970 A1 | 6/2020 | Kawano | |
| 2020/0193982 A1 | 6/2020 | Kim | |
| 2020/0233635 A1* | 7/2020 | Torgerson | H04N 21/8113 |
| 2020/0257496 A1 | 8/2020 | Lee | |
| 2020/0293116 A1* | 9/2020 | Udall | G06F 3/167 |
| 2020/0301657 A1* | 9/2020 | Edmonds | G06F 16/438 |

OTHER PUBLICATIONS

Extended European Search Report from corresponding European Application No. 20163849.1, dated Jul. 22, 2020.
Bernadette Johnson, "How Amazon Echo Works" Nov. 21, 2016, HowStuffWorks pp. 1-15 "https://web.archive.org/web/20161121161159/https://electronics.howstuffworks.com/gadgets/high-tech-gadgets/amazon-echo.htm#".
European Communication in Application 20163849, dated Dec. 21, 2021, 9 pages.

* cited by examiner

REFINEMENT OF VOICE QUERY INTERPRETATION

CROSS-REFERENCE TO RELATED APPLICATION(S)

This application is a continuation of U.S. application Ser. No. 16/421,590 filed May 24, 2019 and titled REFINEMENT OF VOICE QUERY INTERPRETATION, which claims priority to U.S. application Ser. No. 62/820,691 filed Mar. 19, 2019 and titled REFINEMENT OF VOICE QUERY INTERPRETATION, the disclosures of which are hereby incorporated by reference in their entireties.

BACKGROUND

A user interacts with a voice-enabled device by providing voice input to request performance of a command. For example, a user asks the voice-enabled device to play some type of media content or to check an account balance. The voice-enabled device can then execute a command responsive to the request, such as to play the particular type of media content or provide the account balance, by generating audio output associated with the executed command using an audio output device, such as a speaker of the voice-enabled device.

Interaction with voice-enabled devices are often convenient and desirable due to the hands-free nature of the interaction. However, one of the difficulties in fulfilling voice requests is the ambiguity that is often present in the voice request received from the user. For example, in the media content playback scenario, if the user asks the voice-enabled device to "play hello," there are many possible options as to what the user might be asking for, such as to play a song titled "hello," a podcast titled "hello," or a song or album by the band named "hello." Similarly, in the account balance scenario, the user likely has multiple accounts, such as a checking account, a savings account and an investment account, each having an associated balance.

SUMMARY

In general terms, this disclosure is directed to a system for refining voice query interpretations. In one possible configuration and by non-limiting example, a user voice query requesting execution of a command is received from a voice-enabled device and interpreted to identify command(s) responsive to the voice query, and a graphical user interface is generated and displayed at a GUI-capable device to enable refinement of the interpretation of the voice query. Various aspects are described in this disclosure, which include, but are not limited to, the following aspects.

One aspect is a method for refining an interpretation of a voice query, the method comprising receiving a voice query requesting execution of a command by a voice-enabled device; determining an interpretation of the voice query; generating a graphical user interface for display at a GUI-capable device, the graphical user interface including a set of selectable options, each of the selectable options relating to the voice query and identifying a refinement of the interpretation of the voice query; receiving a selection of one of the selectable options; and executing a command associated with the selected option.

Another aspect is a method for refining an interpretation of a voice query, the method comprising receiving, from a voice-enabled device, a voice query requesting playback of media content; determining an interpretation of the voice query; determining a first media content item responsive to the voice query based on the interpretation; providing the first media content item to the voice-enabled device for playback; providing instructions for generating and displaying a graphical user interface at a GUI-capable device, the graphical user interface including a set of selectable options, each of the selectable options relating to the voice query and identifying a refinement of the interpretation of the voice query; receiving, from the GUI-capable device, a selection of one of the selectable options; identifying a second media content item associated with the selected option; and providing the second media content item to the voice-enabled device for playback.

A further aspect is a server for refining an interpretation of a voice query, the server comprising at least one processing device; and a memory coupled to the at least one processing device and storing instructions, that when executed by the at least one processing device, cause the at least one processing device to receive, from a voice-enabled device, a voice query requesting playback of media content; determine an interpretation of the voice query; determine a first media content item responsive to the voice query based on the interpretation; provide the first media content item to the voice-enabled device for playback; provide instructions for generating and displaying a graphical user interface at a GUI-capable device, the graphical user interface including a set of selectable options, each of the selectable options relating to the voice query and identifying a refinement of the interpretation of the voice query; receive, from the GUI-capable device, a selection of one of the selectable options; identify a second media content item associated with the selected option; and provide the second media content item to the voice-enabled device for playback.

Yet another aspect is a device for refining an interpretation of a voice query, the device comprising a display; at least one processing device; and a memory coupled to the at least one processing device and storing instructions, that when executed by the at least one processing device, cause the at least one processing device to receive, from a media delivery system, instructions for generating and displaying a graphical user interface; generate the graphical user interface based on the instructions; render the graphical user interface in the display, the graphical user interface including at least a set of selectable options, each of the selectable options relating to a voice query received at a voice-enabled device and identifying a refinement of an interpretation of the voice query made by the media delivery system; detect a selection of one of the selectable options; and provide the selected option to the media delivery system such that a media content item associated with the selected option can be identified and provided to the voice-enabled device for playback.

DETAILED DESCRIPTION

Figure 1:
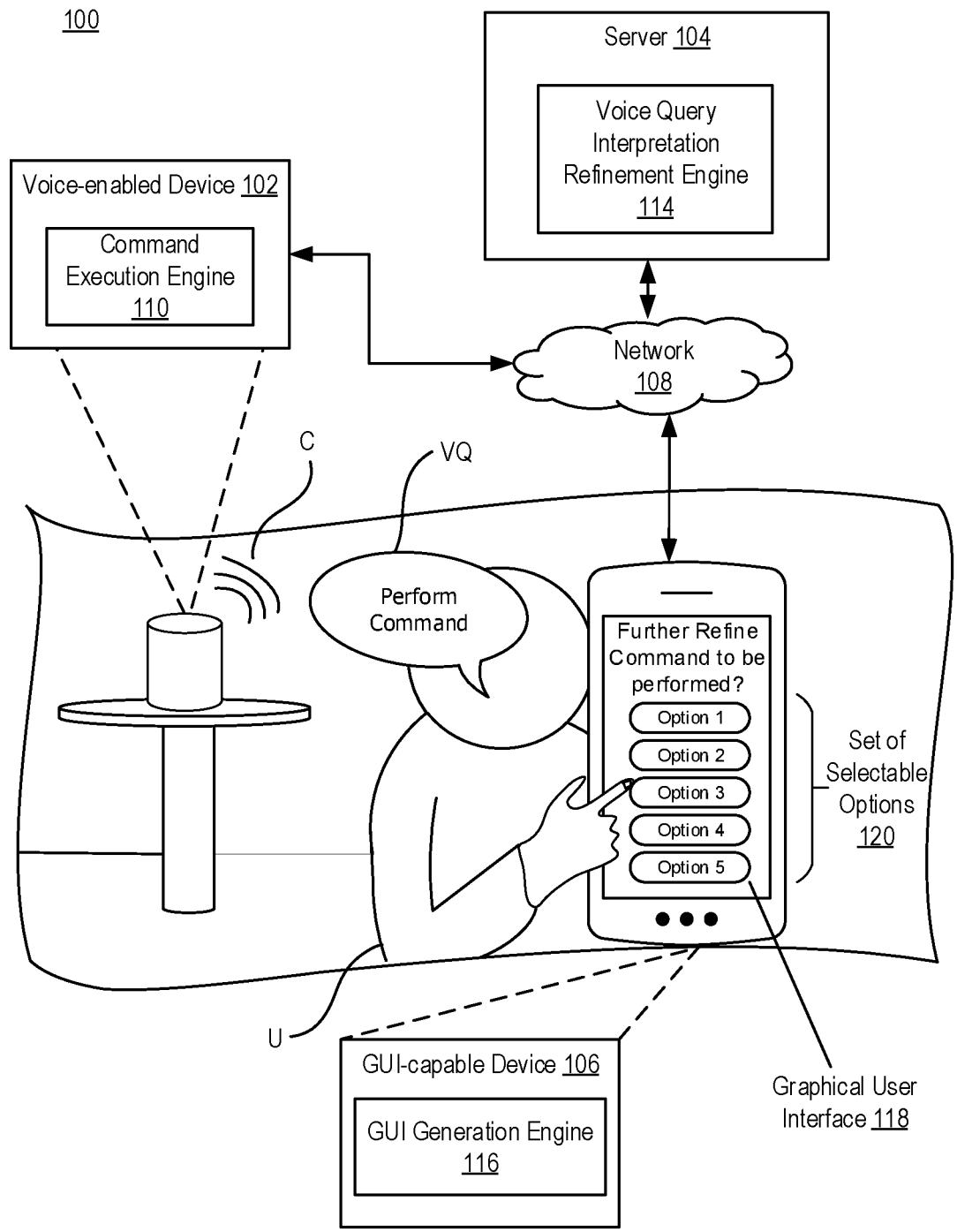
FIG. 1 illustrates an example voice interaction system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example voice interaction system 100. In this example, the voice interaction system 100 includes a voice-enabled device 102, a server 104, and a GUI-capable device 106. In this example, the voice-enabled device 102 includes a command execution engine 110, the server 104 includes a voice query interpretation refinement engine 114, and the GUI-capable device 106 includes a GUI generation engine 116. The voice interaction system 100 communicates across a network 108. Also shown is a user U who interacts with the voice interaction system 100. While FIGS. 1 and 2 describe a general voice interaction system 100, two specific examples of the voice interaction system 100 include a media playback system and an automated telephone system, which are discussed in detail in conjunction with FIGS. 3-11 and FIGS. 12-13, respectively.

In some embodiments, the voice-enabled device 102 is a computing device comprising a voice user interface (VUI). The VUI allows the user U to interact with the voice-enabled device 102 by providing voice input. However, in some examples, the voice-enabled device 102 lacks a graphical user interface with which the user U can efficiently interact with and/or control the voice-enabled device 102 via touch input, pen or stylus input, and/or other traditional methods of input (e.g., keyboard and mouse input). An example voice-enabled device 102 can include a Google Home, an Amazon Echo, and an automated telephone system, among other similar devices.

In this embodiment, the voice-enabled device 102 operates to receive a voice query VQ from the user U and execute a command C responsive to the voice query VQ. For example, the voice-enabled device 102 can provide the voice query VQ to and receive the responsive command C from the server 104 over the network 108. The command execution engine 110 can then generate audio output associated with the executed command using an audio output device (e.g., a speaker) therein. In some embodiments, an initial command responsive to the voice query VQ is executed, and while the initial command is executing at the voice-enabled device 102, the voice query VQ is refined by the user U through a graphical user interface 118 that is generated and displayed at the GUI-capable device 106, described below.

The execution of the initial command then ceases as a command identified to be responsive to the refined voice query VQ is executed by the command execution engine 110.

In this embodiment, the server 104 operates to interpret the voice query VQ, and based on the interpretation, determine and provide commands responsive to the voice query VQ, including command C, to the voice-enabled device 102 for execution. Additionally, the server 104 operates to provide instructions to the GUI-capable device 106 for the generation and display of the graphical user interface 118 at the GUI-capable device 106, where the graphical user interface 118 includes a set of selectable options 120 that relate to and identify a refinement of the interpretation of the voice query VQ. If the user U selects one of the selectable options 120, the server 104 further operates to identify the command C associated with the selected option (e.g., a command identified to be responsive to the refined voice query VQ), and provide the identified command C to the voice-enabled device 102 for execution. In other examples, if the user U selects one of the selectable options, a set of selectable sub-options are displayed that identify yet another refinement of the interpretation of the voice query VQ.

In some examples, the server 104 is connectable to a plurality of voice-enabled devices 102 and provides commands to the voice-enabled devices 102 independently or simultaneously. Similarly, in some embodiments, the server 104 is connectable to a plurality of GUI-capable devices 106 and provides instructions for the generation and display of graphical user interfaces to the GUI-capable devices 106 independently or simultaneously.

In some embodiments, the GUI-capable device 106 is a computing device, such as a smartphone, a tablet, a wearable computing device, a laptop, or a desktop computer, that has the capability to generate and display graphical user interfaces, such as the graphical user interface 118. Additionally, in some examples, the GUI-capable device 106 and the voice-enabled device 102 can be a same device.

In this embodiment, the GUI generation engine 116 operates to receive instructions from the server 104 to generate and display the graphical user interface 118. As previously described, the graphical user interface displays the set of selectable options 120 and, in some embodiments, can include information associated with the initial command being executed (e.g., if the initial command was executed). Through a selection of one of the options within the set of selectable options 120, the user U can refine the interpretation of the voice query VQ to control the command that is to be executed on the voice-enabled device 102. The user U can interact with the GUI-capable device and associated graphical user interface 122 by providing one or more of touch input, pen or stylus input, and/or other traditional methods of input (e.g., keyboard and mouse input) depending on a type of the GUI-capable device 106.

In some embodiments, the GUI-capable device 106 operates to execute one of a thick or a thin version of an application that is associated with the server 104 and/or a service with which the server 104 is also associated with. In some examples, the server 104 provides the instructions for generating and displaying the graphical user interface 118 to the GUI-capable device 106 in response to the application executing on the GUI-capable device 106.

Figure 2:
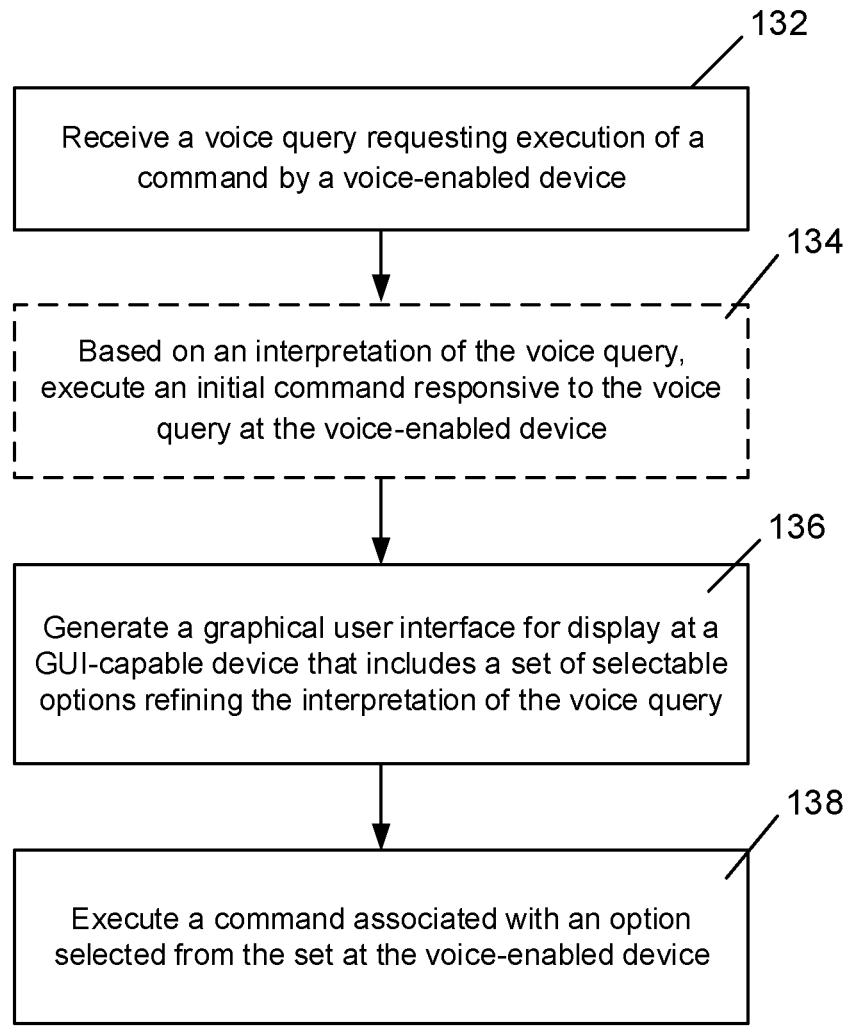
FIG. 2 illustrates an example method for refining an interpretation of a voice query.

FIG. 2 illustrates an example method 130 for refining an interpretation of a voice query. In this example, the method 130 is described as being performed by the voice interaction system 100, including the voice-enabled device 102, the server 104, and the GUI-capable device 106 as described in FIG. 1.

In this embodiment, a voice query VQ is received by the voice-enabled device 102 at operation 132. In some embodiments, the voice query VQ is a request for execution of a command at the voice-enabled device 102, where the voice query VQ is provided by a user (e.g., the user U described in FIG. 1). For example, the voice query VQ can be a request for playback of media content, a request for directions, a request to purchase a product, or a request to check a balance on an account, among other similar requests.

Optionally, at operation 134, based on an interpretation of the voice query VQ, the voice-enabled device 102 can execute an initial command responsive to the voice query VQ. For example, the server 104 can determine an interpretation of the voice query VQ, where the initial command may be identified as a command most likely to satisfy the user's intent in providing the voice query VQ. Alternatively, in other examples, no command is executed and the method proceeds to operation 136.

In this embodiment, the graphical user interface 118 is generated and displayed at the GUI-capable device 106 at operation 136. The graphical user interface 118 includes the set of selectable options 120 that relate to the voice query VQ, where each option within the set of selectable options 120 identifies a refinement of the interpretation of the voice query VQ. In some examples, one or more of the options within the set of selectable options 120 can include a set of sub-options, where each sub-options identifies a yet further refinement of the interpretation of the voice query VQ.

In this embodiment, one of the options is selected, and in response, a command is executed at the voice-enabled device 102 that is associated with the option selected at operation 138. If the initial command was executed at optional operation 204, the execution of the initial command is ceased as the identified command is executed.

Figure 3:
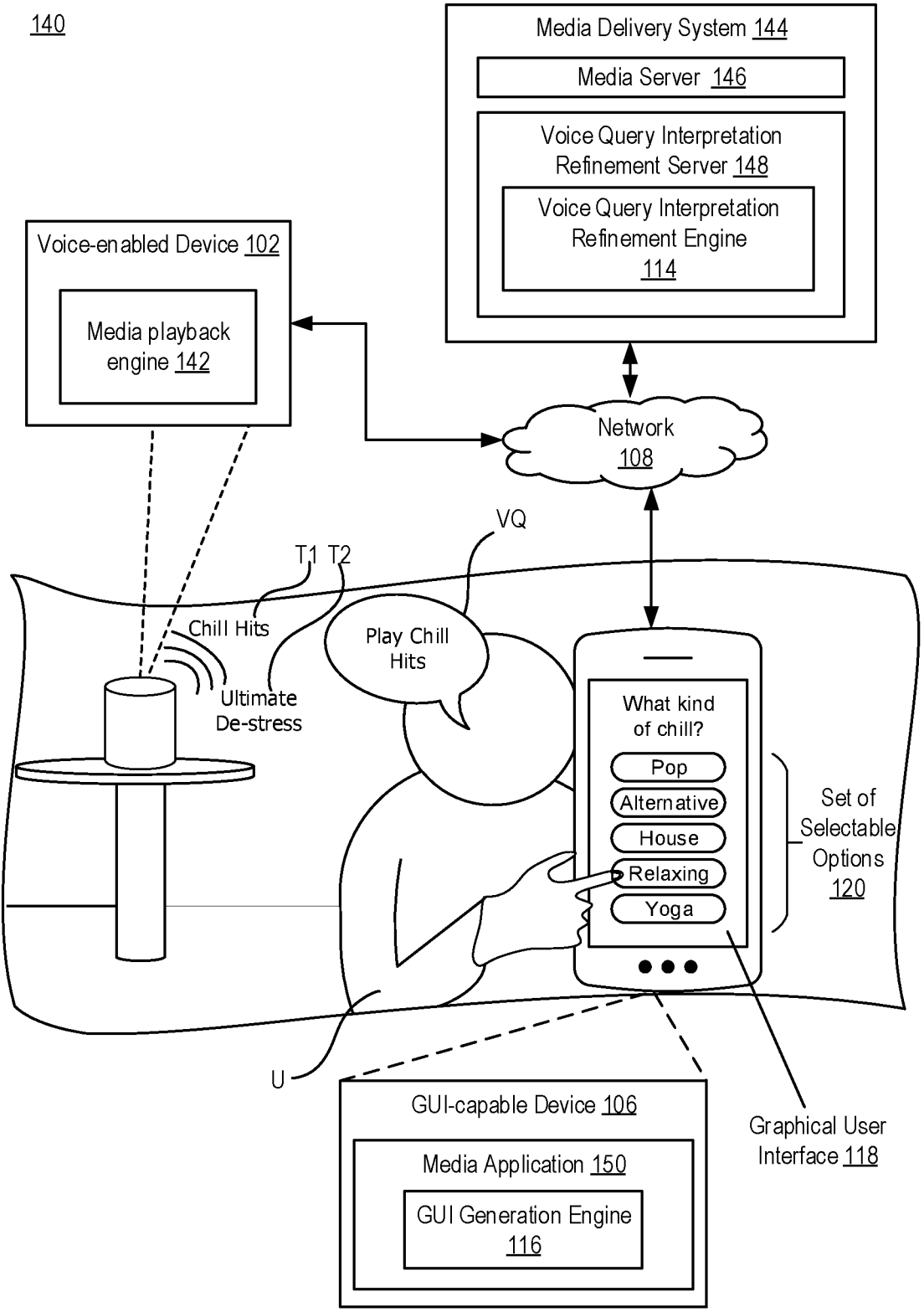
FIG. 3 illustrates an example media playback system.

FIG. 3 illustrates an example media playback system 140. The media playback system 140 is an example of the voice interaction system 100, shown in FIG. 1. In this example, the media playback system 140 includes the voice-enabled device 102, a media delivery system 144, and the GUI-capable device 106. In this example, the voice-enabled device 102 includes a media playback engine 142, the media delivery system 144 includes a media server 146 and a voice query interpretation refinement server 148 comprising the voice query interpretation refinement engine 114, and the GUI-capable device 106 includes a media application 150 and a GUI generation engine 116. The media playback system 140 communicates across the network 108. Also shown is the user U who interacts with the media playback system 140.

In some embodiments, the voice-enabled device 102 is a computing device comprising a voice user interface (VUI). The VUI allows the user U to interact with the voice-enabled device 102 by providing voice input. However, in some examples, the voice-enabled device 102 lacks a graphical user interface with which the user U can efficiently interact with and/or control the voice-enabled device 102 via touch input, pen or stylus input, and/or other traditional methods of input (e.g., keyboard and mouse input). An example voice-enabled device 102 can include a Google Home, an Amazon Echo, and an automated telephone system, among others.

In this embodiment, the voice-enabled device 102 operates to receive the voice query VQ from the user U and playback media content items responsive to the voice query VQ. For example, the user U asks the voice-enabled device 102 to "play chill music" and in response, the voice-enabled device 102 plays a popular playlist "chill hits" (e.g., first media content item T1). In some embodiments, the voice-enabled device 102 can provide the voice query VQ to and receive the responsive media content items from the media delivery system 144 over the network 108.

In some examples, the media playback engine 142 of the voice-enabled device 102 can then generate media output using a media output device (e.g., a speaker) therein to playback the media content items. In other examples, the voice-enabled device 102 operates to transmit the media content items to another device for playback, such as an external speaker or another media playback device (e.g., a vehicle entertainment system or a home entertainment system). A media content item is an item of media content, including audio, video, or other types of media content, which may be stored in any format suitable for storing media content. Non-limiting examples of media content items include songs, playlists, albums, music videos, movies, television episodes, podcasts, other types of audio or video content, and portions or combinations thereof.

In this embodiment, the media delivery system 144 operates to determine an interpretation of the voice query VQ, and based on the interpretation, determine and provide media content items responsive to the voice query VQ to the voice-enabled device 102 for playback. Additionally, the media delivery system 144 operates to provide instructions to the GUI-capable device 106 for generating and displaying the graphical user interface 118 to enable refinement of the interpretation of the voice query VQ. For example, when providing the voice query VQ, the user U may have a particular intent. In the illustrated example, when the user U asks the voice-enabled device 102 to "play chill music" he or she likely intends for a specific type of media content item to be played back. In some scenarios, the media content items determined and provided by the media delivery system 144 based on the interpretation satisfy the user's intent. In other scenarios, the ambiguity of the voice query VQ can cause the media delivery system 144 to identify and provide for playback media content items that do not satisfy the user's intent. In this latter scenario, the graphical user interface 118 enabling refinement of the interpretation helps the user's intent to be achieved.

In some embodiments, the media delivery system 144 is connectable to a plurality of voice-enabled devices 102 and provides media content items to the voice-enabled devices 102 independently or simultaneously. Similarly, in some embodiments, the media delivery system 144 is connectable to a plurality of GUI-capable devices 106 and provides instructions for the generation and display of the graphical user interface 118 to the GUI-capable devices 106 independently or simultaneously.

As previously discussed, the voice query interpretation refinement server 148 of the media delivery system 144 can include the voice query interpretation refinement engine 114. In this embodiment, the voice query interpretation refinement engine 114 operates to receive the voice query VQ from the voice-enabled device 102 over the network 108, determine an interpretation of the voice query VQ, and determine media content items responsive to the voice query VQ based on the interpretation. Using speech recognition, the voice query VQ is processed into a text query, such as "chill music," suitable for media content search at the media delivery system 144. In some embodiments, the processing is performed by the voice-enabled device 102 or an external third party service. In other embodiments, the processing is performed at the media delivery system 144 by the voice query interpretation refinement engine 114 or a separate speech processing application of the media delivery system 144.

In some embodiments, the voice query interpretation refinement engine 114 determines which media content items are responsive to the voice query VQ individually based on a profile of an account associated with the voice-enabled device 102 (e.g., the user's account profile) and/or collectively based on data associated with a plurality of account profiles (e.g., popularity data). For example, as further described in FIGS. 6-7, the voice query interpretation refinement engine 114 determines responsive media content items from a plurality of media content items stored within a data store at the media server 146 of the media delivery system 144. For example, six media content items can be determined to be responsive to "chill music." A media content item most likely to satisfy the intent of the user U providing the voice query VQ is identified as the first media content item T1 and provided to the voice-enabled device 102 for immediate playback. The remaining responsive media content items represent alternative media content items that could satisfy the user's intent, and can be used to generate a set of selectable options 120 that are later provided to the GUI-capable device 106. For example, a popular playlist "chill hits" is the most likely to satisfy the user's intent in providing the voice query VQ "play chill music" of the six media content items determined to be responsive and is provided as the first media content item T1 to the voice-enabled device 102 for immediate playback. Each of the remaining five media content items is used to generate the set of selectable options 120.

In some embodiments, the generated set of selectable options 120 identify a type or characteristic of the associated alternative media content items, but do not identify the specific media content. For example, the selectable options include "pop," "alternative," "house," "relaxing," and "yoga," which describe music genres, a mood, and an activity associated with media content items, respectively, rather than a specific artist, song, album, or playlist associated with media content items. In other embodiments, the set of selectable options 120 identify the specific media content of the associated alternative media content item, which can include an artist, a song, an album, a playlist, and a podcast, among other examples. In further embodiments, the set of selectable options 120 can be a mix of options identifying a type or characteristic of the associated alternative media content items and options identifying the specific media content.

In some examples, one or more options within the set of selectable options 120 can include a set of selectable sub-options, where each sub-option identifies yet a further refinement of the interpretation of the voice query VQ. For example, the option "pop" comprises a set of selectable sub-options such as "80s pop," "90s pop" and "Millennium pop."

In this embodiment, the media application 150 is associated with the media delivery system 144. For example, the media application 150 enables the user U to interact with the media delivery system 144 through the GUI-capable device 106 to perform various functions, such as search for and play media content items. In some examples, in response to a determination that the media application 150 is executed on the GUI-capable device 106 (e.g., the user U opens the media application 150), the voice query interpretation refinement engine 114 provides instructions to the GUI-capable device 106 for generating and displaying the graphical user interface 118 at the GUI-capable device 106 while the media application 150 is executing. In other embodiments, the instructions are provided following and/or in conjunction with the provision of the first media content item T1 to the voice-enabled device 102. In some examples, a version of the graphical user interface 118 to be generated and displayed depends on an amount of time that has elapsed between the initiation of the playback of the first media content item T1 on the voice-enabled device 102 and execution of the media application 150 at the GUI-capable device 106, as further described in FIG. 8 and illustrated in FIGS. 9-11.

In some examples, the instructions include information associated with the first media content item T1 that is currently playing back on the voice-enabled device 102, such as information about the popular playlist "chill hits." Depending on a type of the media content item, the information can include a song title, a playlist title, an album title, a podcast title, and an artist, among other similar details associated with the media content item.

In this embodiment, the instructions also include to display options, including the set of selectable options 120, which allow the user U to further refine the interpretation of the voice query VQ in order to control and adjust the playback on the voice-enabled device 102. The set of selectable options 120 can be formatted in a list, table, or other visual array that is easily consumable by the user U, and can be scrollable if a number of options is greater than a display screen of the GUI-capable device 106. Additionally, the set of selectable options 120 can be ordered based on their likelihood of satisfying the user's intent in providing the voice query VQ. For example, options with greater likelihoods of satisfaction are displayed first or more prominently than other options.

In this embodiment, if the user U selects one of the selectable options, the voice query interpretation refinement engine 114 receives the selection from the GUI-capable device 106, identifies the alternative media content item associated with the selected option, and provides the identified alternative media content item as the second media content item T2 to the voice-enabled device 102 for playback. For example, when the user U selects "relaxing," the voice query interpretation refinement engine 114 receives the selection and identifies an "ultimate de-stress" playlist from the N-best media content items that is associated with the characteristic of "relaxing." The media server 146 then provides the "ultimate de-stress" playlist to the voice-enabled device 102 for playback as the second media content item T2.

In some embodiments, the GUI-capable device 106 is a computing device, such as a smartphone, a tablet, a wearable computing device, a laptop, or a desktop computer, that has the capability to generate and display graphical user interfaces, such as the graphical user interface 118. In one example, the GUI-capable device 106 and the voice-enabled device 102 can be a same device. The GUI-capable device 106 can operate to execute one of a thick or a thin version of the media application 150 in response to receiving an execute command from the user U. In this embodiment, the media application 150 comprises the GUI generation engine 116. In other embodiments, the GUI generation engine 116 is a separate component of the GUI-capable device 106 that is communicatively coupled to the media application 150.

In this embodiment, in response to the execution of the media application 150, the GUI generation engine 116 operates to receive the instructions from the voice query interpretation refinement server 148 and generate the graphical user interface 118 for display based on the received instructions. In some examples, the graphical user interface 118 is displayed as a user interface of the media application 150. As previously described, the graphical user interface 118 can include information associated with the first media content item T1 that is currently being played back on the voice-enabled device 102, and the set of selectable options 120. Through selection of one of the set of selectable options 120, the user U can refine the interpretation of the voice query VQ at the voice query interpretation refinement engine 114 to control the playback of media content items at the voice-enabled device 102. The user U can interact with the GUI-capable device and associated graphical user interface 118 by providing one or more of touch input, pen or stylus input, and/or other traditional methods of input (e.g., keyboard and mouse input) depending on a type of the GUI-capable device 106.

Figure 4:
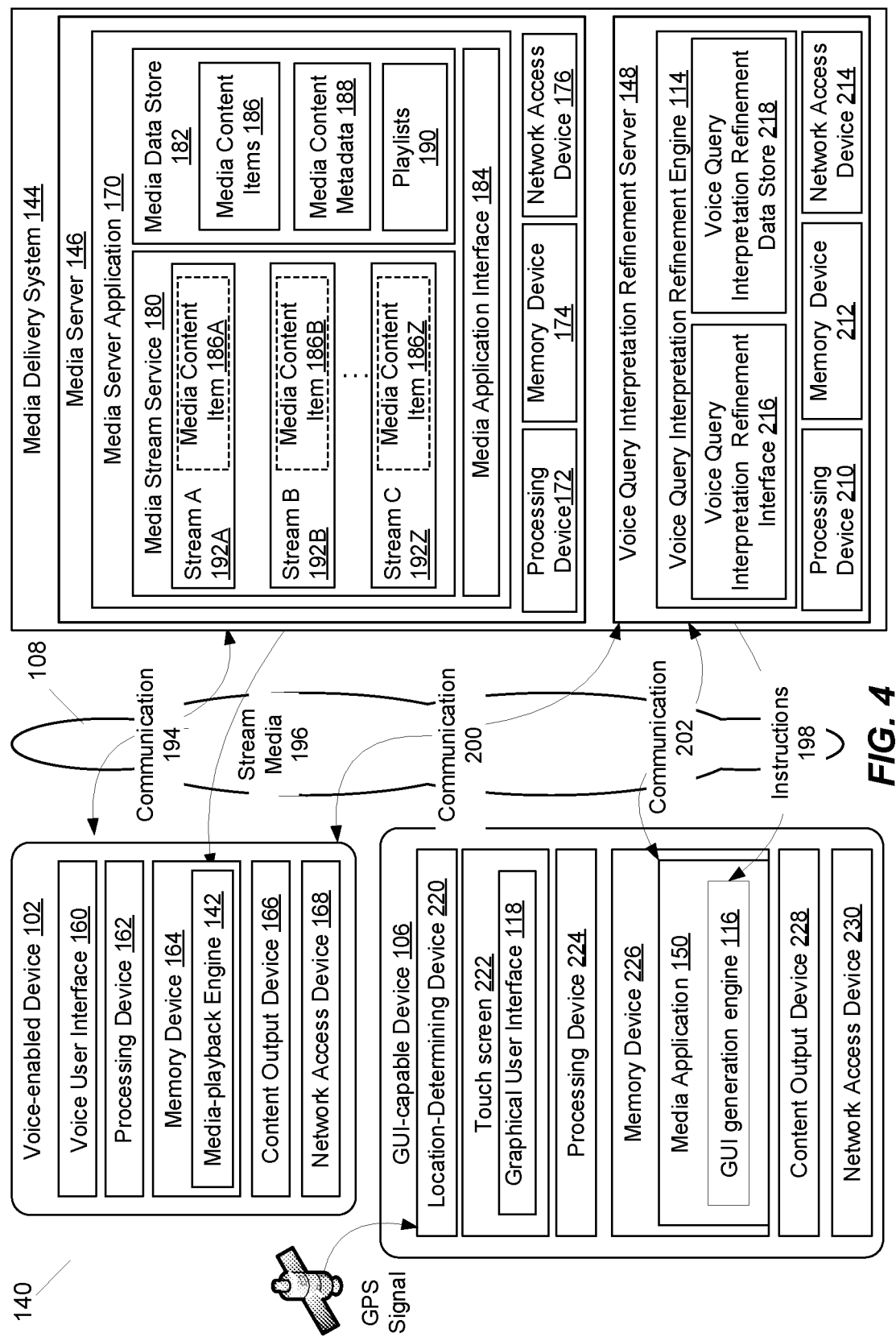
FIG. 4 is a schematic illustration of an example media playback system.

FIG. 4 is a schematic illustration of an example media playback system 140. As also illustrated in FIG. 3, the media playback system 140 can include the voice-enabled device 102, the media delivery system 144, the GUI-capable device 106, and the network 108.

As described herein, the voice-enabled device 102 operates to play media content items. In some embodiments, the voice-enabled device 102 operates to play media content items that are provided (e.g., streamed, transmitted, etc.) by a system external to the voice-enabled device 102 such as the media delivery system 144, another system, or a peer device. Alternatively, in some embodiments, the voice-enabled device 102 operates to play media content items stored locally on the voice-enabled device 102. Further, in at least some embodiments, the voice-enabled device 102 operates to play media content items that are stored locally as well as media content items provided by other systems.

In this embodiment, the voice-enabled device 102 is a computing device that a user (e.g., the user U in FIG. 3) can interact with through voice input. An example voice-enabled device 102 can include a Google Home, an Amazon Echo, and an automated telephone system, among others. In at least some embodiments, the voice-enabled device 102 includes a voice user interface 160, a processing device 162, a memory device 164, a content output device 166 and a network access device 168. Other embodiments may include additional, different, or fewer components.

In some examples, the voice user interface 160 allows the user U to interact with the voice-enabled device 102 by providing voice input. For example, the user U can ask the voice-enabled device to playback a particular type of media content, such as "play uplifting music," and the voice user interface 160 receives the voice input as a voice query VQ.

In some embodiments, the processing device 162 comprises one or more central processing units (CPU). In other embodiments, the processing device 162 additionally or alternatively includes one or more digital signal processors, field-programmable gate arrays, or other electronic circuits.

The memory device 164 operates to store data and instructions. In some embodiments, the memory device 164 stores instructions for a media playback engine 142 that enables playback of media content items received from the media delivery system 144. As described herein, the media playback engine 142 is configured to communicate with the media delivery system 144 to receive one or more media content items (e.g., through the stream media 196).

The memory device 164 typically includes at least some form of computer-readable media. Computer readable media include any available media that can be accessed by the voice-enabled device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the voice-enabled device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 166 operates to output media content. In some embodiments, the content output device 166 generates media output of a media content item for the user U. Examples of the content output device 166 include a speaker, an audio output jack, a Bluetooth transmitter, a display panel, and a video output jack. Other embodiments are possible as well. For example, the content output device 166 may transmit a signal through the audio output jack or Bluetooth transmitter that can be used to reproduce an audio signal by a connected or paired device such as headphones or a speaker.

With still reference to FIG. 4, the media delivery system 144 includes one or more computing devices and operates to determine an interpretation of the voice query VQ, and based on the interpretation, determine and provide media content items responsive to the voice query VQ to the voice-enabled device 102 for playback and, in some embodiments, other media playback devices as well. In some embodiments, the media delivery system 144 operates to transmit stream media 196 to media playback devices such as the voice-enabled device 102. Additionally, the media delivery system 144 operates to provide instructions 198 to GUI-capable devices such as the GUI-capable device 106 to prompt generation and display of the graphical user interface 118 that enables the user U to refine the interpretation of the voice query VQ at the media delivery system 144 to control playback of the stream media 196 at the voice-enabled device 102. In some embodiments, the media delivery system 144 includes the media server 146 and the voice query interpretation refinement server 148.

In this example, the media server 146 comprises a media server application 170, a processing device 172, a memory device 174, and a network access device 176. The processing device 172, memory device 174, and network access device 176 may be similar to the processing device 162, memory device 164, and network access device 168 respectively, which have each been previously described.

In some embodiments, the media server application 170 operates to stream music or other audio, video, or other forms of media content. The media server application 170 includes a media stream service 180, a media data store 182, and a media application interface 184.

The media stream service 180 operates to buffer media content such as media content items 186 (including 186A, 186B, and 186Z) for streaming to one or more streams 192A, 192B, and 192Z.

The media application interface 184 can receive requests or other communication from media playback devices or other systems, to retrieve media content items from the media delivery system 144. For example, in FIG. 4, the media application interface 184 receives communication 194 from the media playback engine 142 of the voice-enabled device 102.

In some embodiments, the media data store 182 stores media content items 186, media content metadata 188, and playlists 190. The media data store 182 may comprise one or more databases and file systems. Other embodiments are possible as well. As noted above, the media content items 186 may be audio, video, or any other type of media content, which may be stored in any format for storing media content.

The media content metadata 188 operates to provide various pieces of information associated with the media content items 186. In some embodiments, the media content metadata 188 includes one or more of title, artist name, album name, length, genre, mood, era, etc. In some examples, media content metadata 188 associated with the first media content item T1 that is playing on the voice-enabled device is provided as part of the instructions 198 for the generation and display of the graphical user interface 118.

The playlists 190 operate to identify one or more of the media content items 186. In some embodiments, the playlists 190 identify a group of the media content items 186 in a particular order. In other embodiments, the playlists 190 merely identify a group of the media content items 186 without specifying a particular order. Some, but not necessarily all, of the media content items 186 included in a particular one of the playlists 190 are associated with a common characteristic such as a common genre, mood, or era.

In this example, the voice query interpretation refinement server 148 comprises the voice query interpretation refinement engine 114, a voice query interpretation refinement interface 216, a voice query interpretation refinement data store 218, a processing device 210, a memory device 212, and a network access device 214. The processing device 210, memory device 212, and network access device 214 may be similar to the processing device 162, memory device 164, and network access device 168 respectively, which have each been previously described.

In some embodiments, the voice query interpretation refinement engine 114 operates to determine an interpretation of the voice query VQ, where the determination includes identification of one or more media content items that are responsive to the voice query VQ. The responsive media content items can be determined from the media content items 186 stored within the media data store 182. In other embodiments, the voice query interpretation refinement engine 114 further operates to provide instructions 198 to the GUI-capable device 106 for generation and display of the graphical user interface 118 at the GUI-capable device 106. The instructions 198 can include information about the first media content item T1 that is currently playing on the voice-enabled device 102 and the selectable options 120, each of the selectable options relating to the voice query VQ and identifying a refinement of the interpretation of the voice query VQ. For example, each of the selectable options correspond to alternative media content items that could satisfy an intent of user U in providing the voice query VQ.

In this embodiment, if the user U selects one of the selectable options displayed in the graphical user interface 118, the voice query interpretation refinement engine 114 operates to identify which alternative media content item is associated with the selected option. The voice query interpretation refinement engine 114 can communicate the identified alternative content to the media server 146. The media server 146 can then retrieve the identified alternative media content item from the media content items 186 within the media data store 182, and provide the identified alternative media content item as the second media content item T2 to the voice-enabled device 102 for playback. In some examples, In some examples, the media stream service 180 can buffer the first media content item T1 and/or the second media content item T2 for streaming to the voice-enabled device 102 (e.g., as stream media 196).

The voice query interpretation refinement interface 216 can receive requests or other communication from media playback devices, GUI-capable devices, or other systems. For example, in FIG. 4, the voice query interpretation refinement interface 216 receives communication 200 from the voice-enabled device 102 that comprises the voice query VQ received from the user U. Additionally, the voice query interpretation refinement interface 216 receives communication 202 from a media application 150 indicating an execution of the media application 150 and/or a selection of one of the selectable options 120 displayed in the graphical user interface 118.

In some embodiments, the voice query interpretation refinement data store 218 stores a list of the media content items determined to be responsive to the voice query VQ and the generated set of selectable options 120. Additionally, the voice query interpretation refinement data store 218 stores information associated with a state of media content item playback at the voice-enabled device 102. For example, information associated with the media content item that is currently playing at the voice-enabled device 102. The voice query interpretation refinement data store 218 may comprise one or more databases and file systems. Other embodiments are possible as well.

In some embodiments, the GUI-capable device 106 is a computing device, handheld entertainment device, smartphone, tablet, watch, wearable device, or other similar device. In yet other embodiments, the GUI-capable device 106 is a laptop computer, desktop computer, television, gaming console, set-top box, network appliance, or a blue-ray or DVD player. In other embodiments, the GUI-capable device 106 and the voice-enabled device 102 are a same device.

In at least some embodiments, the GUI-capable device 106 includes a location-determining device 220, a touch screen 222, a processing device 224, a memory device 226, a content output device 228, and a network access device 230. Other embodiments may include additional, different, or fewer components. For example, some embodiments may include a recording device such as a microphone or camera that operates to record audio or video content. As another example, some embodiments do not include one or more of the location-determining device 220 and the touch screen 222.

The location-determining device 220 is a device that determines the location of the GUI-capable device 106. In some embodiments, the location-determining device 220 uses one or more of the following technologies: Global Positioning System (GPS) technology which may receive GPS signals from satellites S, cellular triangulation technology, network-based location identification technology, Wi-Fi positioning systems technology, and combinations thereof.

The touch screen 222 operates to receive an input from a selector (e.g., a finger, stylus etc.) controlled by the user U. In some embodiments, the touch screen 222 operates as both a display device and a user input device. In some embodiments, the touch screen 222 detects inputs based on one or both of touches and near-touches. In some embodiments, the touch screen 222 displays a graphical user interface for interacting with the GUI-capable device 106, including the graphical user interface 118 for refining the interpretation of the voice query VQ. As noted above, some embodiments do not include a touch screen 222. Some embodiments include a display device and one or more separate user interface devices. Further, some embodiments do not include a display device.

The processing device 224, memory device 226, content output device 228, and network access device 230 may be similar to the processing device 162, memory device 164, content output device 166, and network access device 168 respectively of the voice-enabled device 102, which have each been previously described.

Additionally, in some embodiments, the memory device 226 stores instructions for the media application 150 and the GUI generation engine 116. In some embodiments the GUI generation engine 116 is a component of the media application 150. In other embodiments, the GUI generation engine 116 is a separate component of the GUI-capable device 106.

In this embodiment, the media application 150 is associated with the media delivery system 144, and when executed by the GUI-capable device 106, is operable to enable interactions with the media delivery system 144. For example, the media application 150 enables the user U to browse for and play media content items, as well as receive additional information associated with media content items, among other similar functions. The GUI-capable device 106 can execute a thin version of the media application 150 (e.g., a web browser) or a thick version of the media application 150 (e.g., a locally installed application).

In this embodiment, the GUI generation engine 116 is operable to generate and display the graphical user interface 118 based on the instructions 198 received from the voice query interpretation refinement engine 114 via the voice query interpretation refinement interface 216. The generated graphical user interface 118 includes information about a media content item currently playing back at the voice-enabled device 102, such as first media content item T1, as well as the set of selectable options 120 that relate to the voice query and identify a refinement of the interpretation of the voice query VQ. The user U is enabled to interact with the graphical user interface 118 to select one of the selectable options in order to refine the interpretation of voice query VQ at the voice query interpretation refinement engine 114 and correspondingly adjust the media content item played back at the voice-enabled device 102.

Referring still to FIG. 4, the network 108 is an electronic communication network that facilitates communication between the voice-enabled device 102, the media delivery system 144, and the GUI-capable device 106. An electronic communication network includes a set of computing devices and links between the computing devices. The computing devices in the network use the links to enable communication among the computing devices in the network. The network 108 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 108 includes various types of links. For example, the network 108 can include wired and/or wireless links, including Bluetooth, ultra-wideband (UWB), 802.11, ZigBee, cellular, and other types of wireless links. Furthermore, in various embodiments, the network 108 is implemented at various scales. For example, the network 108 can be implemented as one or more local area networks (LANs), metropolitan area networks, subnets, wide area networks (such as the Internet), or can be implemented at another scale. Further, in some embodiments, the network 108 includes multiple networks, which may be of the same type or of multiple different types.

Although FIG. 4 illustrates only a single voice-enabled device 102 and a single GUI-capable device 106 communicable with a single media delivery system 144, in accordance with some embodiments, the media delivery system 144 can support the simultaneous use of multiple voice-enabled devices and GUI-capable devices. Additionally, the voice-enabled device 102 can simultaneously access media content from multiple media delivery systems and the GUI-capable device 106 can simultaneously receive instructions related to GUI generation from multiple media delivery systems.

Figure 5:
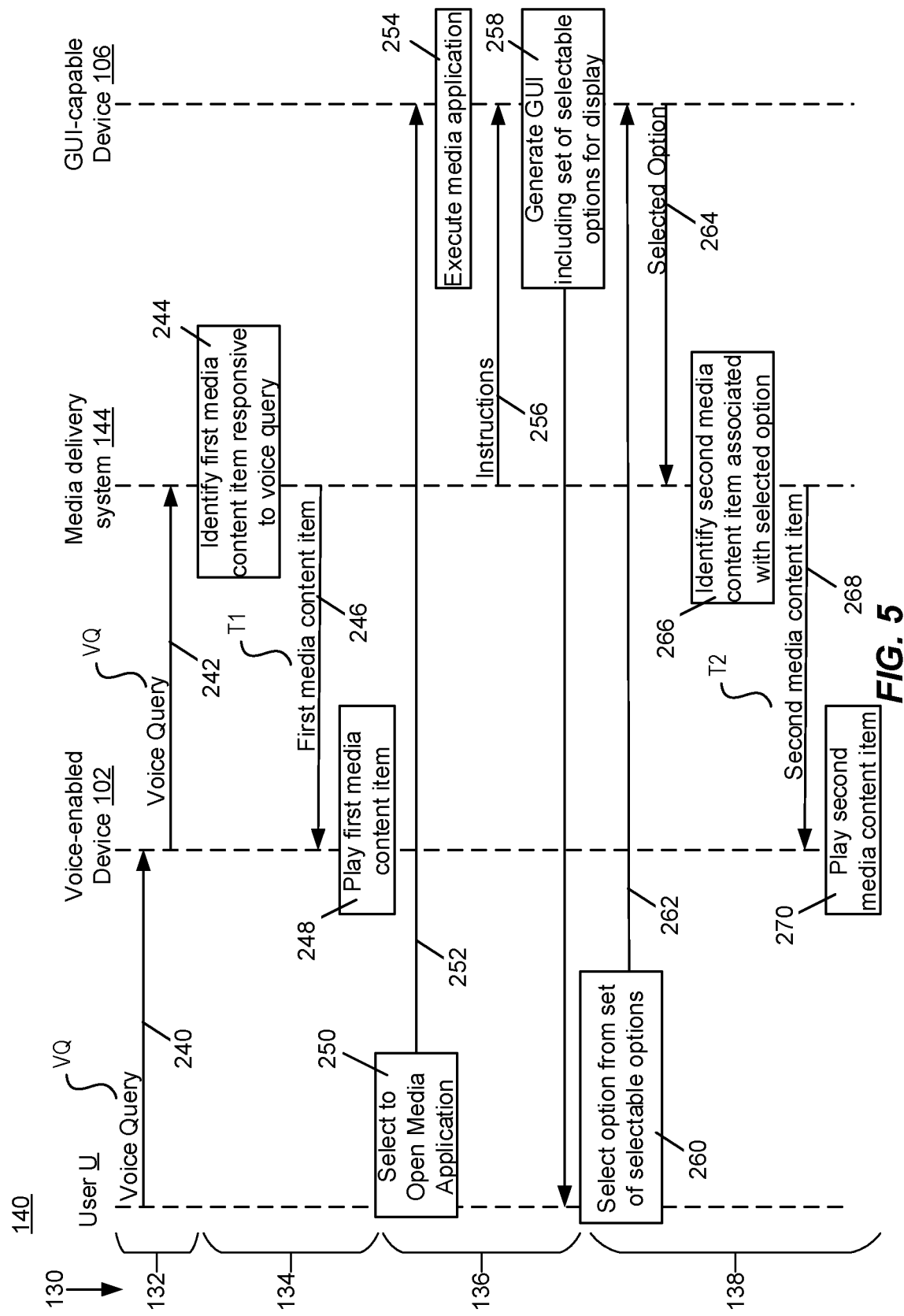
FIG. 5 is a communication diagram illustrating interactions between components of an example media playback system.

FIG. 5 is a communication diagram illustrating interactions between components of the media playback system 140, and illustrates an example of the method 130 for refining a voice query as previously described with reference to FIG. 2. As previously described with reference to FIG. 3, the example media playback system 140 includes the voice-enabled device 102, the media delivery system 144, the GUI-capable device 106, and the network 108. Also shown is the user U who interacts with the media playback system 140. The example method 130 includes operations 132, 134, 136, and 138.

In some embodiments, the components of the media playback system 140 interact to perform the example method 130 for refining an interpretation of a voice query VQ described in FIG. 2. For example, operations 240 and 242 can be used to at least partially perform the operation 132. The voice-enabled device 102 can receive the voice query VQ from the user U at operation 240, and provide the voice query VQ to the media delivery system 144 at operation 242.

In some embodiments, operations 244, 246, and 248 can be used to at least partially perform the operation 134. For example, the media delivery system 144 can determine a first media content item responsive to the voice query VQ at operation 244, and provide the first media content item T1 to the voice-enabled device 102 for playback at operation 246. The determination and provision of the first media content item T1 can be based on a determined interpretation of the voice query VQ performed by the media delivery system 144. Upon receipt of the first media content item, at operation 248, the voice-enabled device 102 can generate media output using a media output device (e.g., a speaker) therein to play the first media content item T1.

In some embodiments, operations 250, 252, 254, 256, and 258 can be used to at least partially perform the operation 136. For example, following initiation of the playback of the first media content item T1 on the voice-enabled device 102, the user U selects to open the media application 150 at operation 250 and a command to execute the media application 150 is detected at the GUI-capable device 106 at operation 252. In response, the GUI-capable device 106 can execute the media application 150 at operation 254. In some embodiments, a time period having elapsed between the playback of first media content item T1 on the voice-enabled device 102 and the execution of the media application 150 at GUI-capable device 106 is determined.

In some embodiments, at operation 256, the media delivery system 144 provides instructions (e.g., the instructions 198) to the GUI-capable device 106 for generating and displaying the graphical user interface 118 in response to the execution of the media application 150. In other embodiments, at operation 256, the media delivery system 144 provides the instructions to the GUI-capable device 106 regardless of whether the user selects to open the media application 150. For example, the media delivery system 144 can provide the instructions to the GUI-capable device 106 immediately after and/or in conjunction with operation 246. Based on the instructions, the GUI-capable device 106 can generate and display the graphical user interface 118 at operation 258.

In this embodiment, the graphical user interface 118 displays options, including the set of selectable options 120 (FIG. 3), which allow the user U to refine the interpretation of the voice query VQ at the media delivery system 144 and correspondingly control playback on the voice-enabled device 102. Additionally, in some examples, the graphical user interface 118 displays information associated with the first media content item T1 that is currently playing back on the voice-enabled device 102. In other embodiments, different versions of the graphical user interface 118 are generated and displayed based on the period of time that has elapsed between the initiation of the playback of the first media content item T1 on the voice-enabled device 102 and the execution of the media application 150 at the GUI-capable device 106.

In yet further embodiments, operations 260, 262, 264, 268, and 270 can be used to at least partially perform the operation 138. For example, the user U selects one of the selectable options at operation 260, and a command indicating the selected option is transmitted to the GUI-capable device at operation 262. The GUI-capable device 106 can then provide the selected option to the media delivery system 144 at operation 264. The media delivery system 144 can identify the second media content item T2 associated with the selected option at operation 266, and provide the identified second media content item T2 to the voice-enabled device 102 at operation 268. Upon receipt of the second media content item T2 from the media delivery system 144, the voice-enabled device 102 can generate media output using a media output device (e.g., a speaker) therein to playback the second media content item T2 at operation 270.

Figure 6:
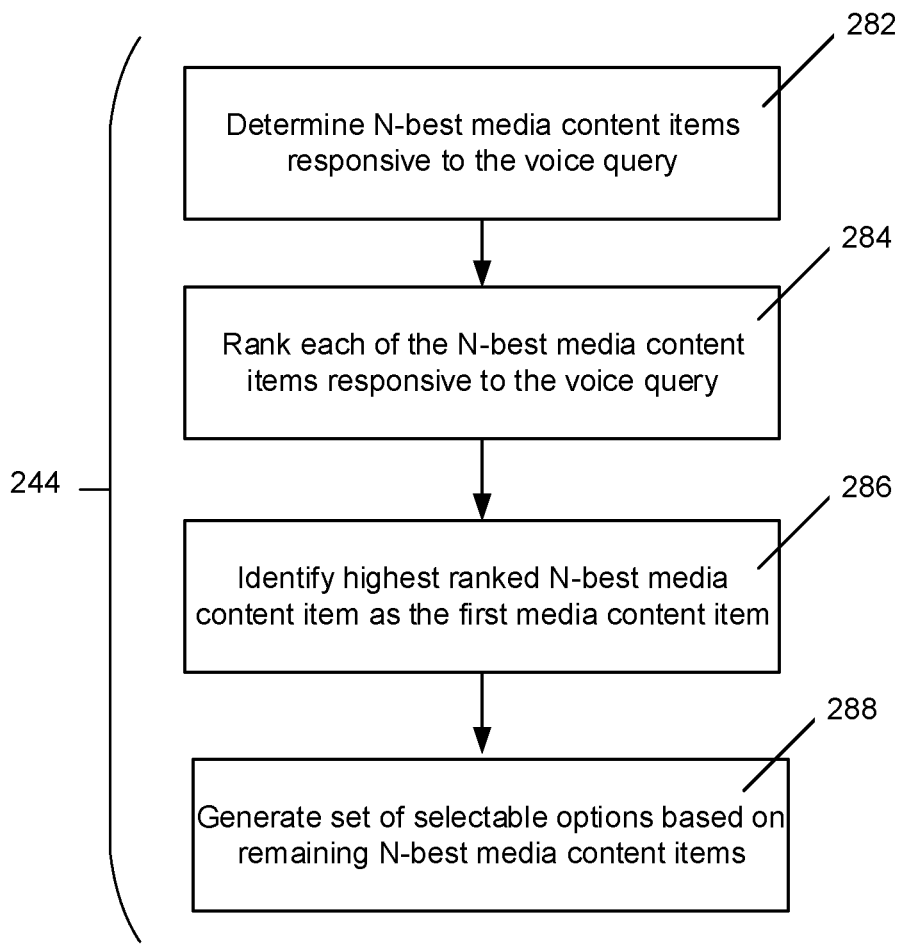
FIG. 6 is a flowchart of an example method for identifying a first media content item responsive to the voice query.

FIG. 6 is a flowchart of an example method 280 for identifying a first media content item T1 responsive to the voice query VQ. In some embodiments, the method 280 can be used to at least partially perform the operation 244 described in FIG. 5.

In some embodiments, the method 280 can be performed by the media delivery system 144. For example, the method 280 can be used by voice query interpretation refinement engine 114 for identifying the first media content item T1 to provide to the voice-enabled device 102 for playback. Additionally, the method 280 can be used by the voice query interpretation refinement engine 114 to generate the set of selectable options 120 to be included in the graphical user interface 118.

The method 280 can begin at operation 282, in which the voice query interpretation refinement engine 114 determines the N-best media content items responsive to the voice query VQ at operation 282. The N-best media content items can be determined from a plurality of media content items stored within a data store of the media server 146 (e.g., the media content items 186 stored in media data store 182). An example of the operation 282 is illustrated and described in further detail with reference to FIG. 7.

At operation 284, the voice query interpretation refinement engine 114 then ranks the N-best media content items based on a likelihood that each satisfy an intent of the user U in providing the voice query VQ. The determined and ranked N-best media content items can be stored in the voice query interpretation refinement data store 218. In this embodiment, a determination of an interpretation of the voice query VQ is based on the determined and ranked N-best media content items, as further described below in conjunction with operations 286 and 288 and in FIG. 7.

In some embodiments, the determination and ranking of the N-best media content items can take into account the individual preferences and tastes of the user, such as based at least in part on a user profile of an account associated with the voice-enabled device 102 (e.g., the user's account profile). For example, a media content item selected by the user in response to a previously received voice query similar to the voice query VQ can be included and ranked highly within a list of the N-best media content items. As a further example, media content items that are determined to likely satisfy the user's intent in providing the voice query VQ and are frequently requested by and/or listened to by the user U, or that have a musical profile that is similar to a user's musical taste profile, can be included and ranked highly within the list of the N-best media content items. Similarly, a query that the user U has never requested or media content items that have not been listened to in the past or that do not match the user's music taste profile could be ranked lower or not included in the ranking of N-best media content items.

In other embodiments, the determination and ranking of the N-best media content items can be collectively based on data associated with a plurality of account profiles (e.g., popularity data). For example, media content items that have been requested, listened to, and/or favorited by a large number of other users in response to similar queries can be included and ranked high within the N-best media content items. In further embodiments, the determination and ranking of the N-best media content items can be both individually based on a specific user's account profile and collectively based on popularity data, or other factors.

At operation 286, the highest ranked media content item from the N-best media content items is identified as the first media content item T1. In some embodiments, the highest ranking N-best media content represents the interpretation of the voice query VQ. In other embodiments, the remaining N-best media content items represent refinements to the interpretation of the voice query VQ, and are used to generate the set of selectable options 120 (FIG. 3) at operation 288. Each option within the generated set of selectable options 120 relates to and identifies a refinement of the interpretation of the voice query VQ at the voice query interpretation refinement engine 114. For example, the remaining N-best media content items represent alternative media content items that could satisfy an intent of the voice query VQ. Therefore, each option can be generated to identify one of the alternative media content items (i.e., one of the remaining N-best media content items).

In some embodiments, the generated set of selectable options 120 (FIG. 3) identify a type or characteristic of the associated alternative media content items, such as a genre, a mood, or an activity associated with media content items, but do not identify the specific media content. In other embodiments, the set of selectable options 120 identify the specific media content of the associated alternative media content item, which can include an artist, a song, an album, a playlist, and a podcast, among other examples. In further embodiments, the set of selectable options 120 can be a mix of options identifying a type or characteristic of the associated alternative media content items and options identifying the specific media content.

Figure 7:
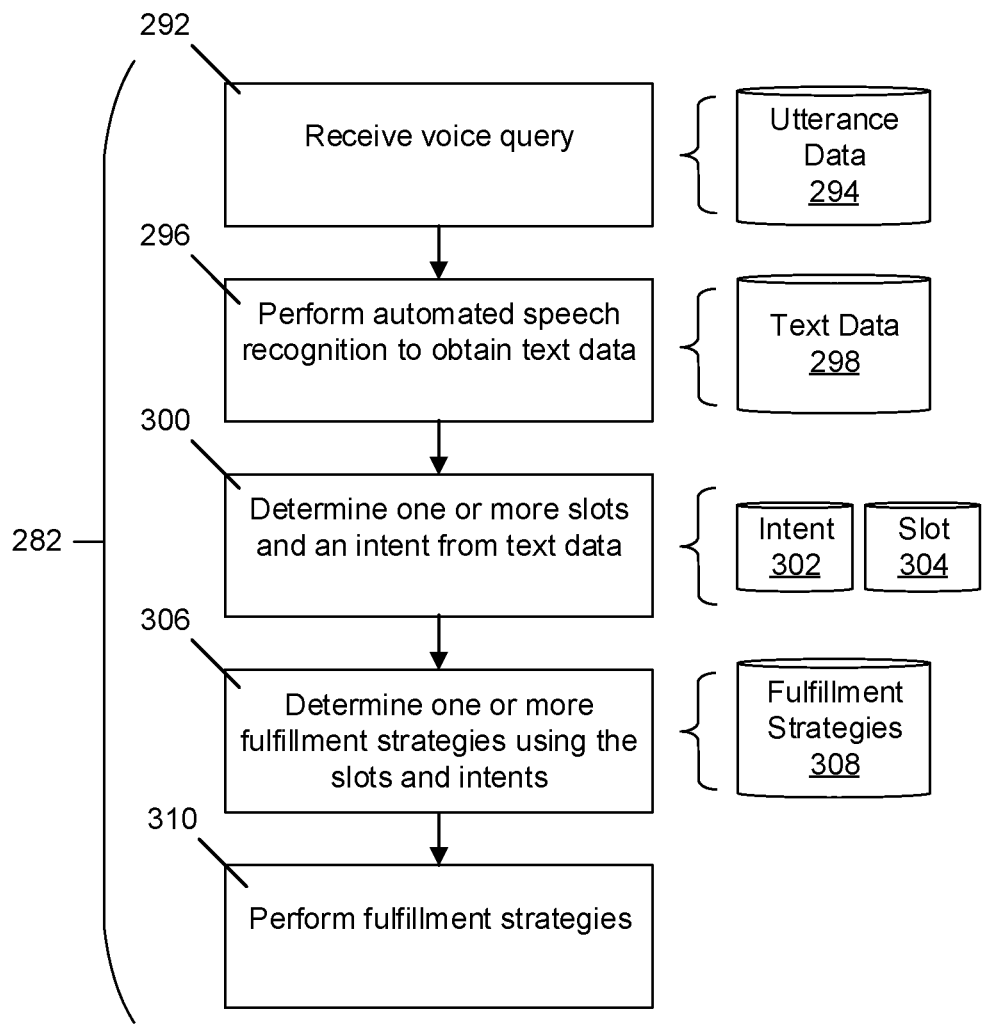
FIG. 7 is a flowchart of an example method for determining N-best media content items responsive to the voice query.

FIG. 7 is a flowchart of an example method 290 for determining N-best media content items responsive to the voice query. In some embodiments, the method 290 can be used to at least partially perform the operation 282 of the method 280 shown in FIG. 6.

In some embodiments, the method 290 can be performed by the media delivery system 144. For example, the method 290 can be used by the voice query interpretation refinement engine 114 for performing a fulfillment strategy based on a received voice query.

The method 290 can begin at operation 292 in which the media delivery system 144 receives the voice query, which is in a form of an utterance. The utterance of the voice query can be stored and received as utterance data 294 by the media delivery system 144. The utterance data 294 is data describing the utterance of the voice query. In at least some embodiments, the utterance data 294 is an audio recording that contains the utterance being spoken. In some examples, the utterance data 294 is received as an entire audio data file. For instance, the voice-enabled device 102 buffers the utterance data 294 as it is obtained. The utterance data 294 that is buffered is then sent to the media delivery system 144 for processing. In other instances, the voice-enabled device 102 streams the utterance data 294 to the media delivery system 144 in real-time as the utterance data 294 is received. In some examples, the utterance data 294 is stored (e.g., by the media delivery system 144) in a data store after it is received. After the utterance data 294 is received, the method 290 moves to operation 296.

Operation 296 includes performing automated speech recognition on the utterance data 294 to obtain text data 298. In some embodiments, performing automated speech recognition includes providing the utterance data 294 as input to an automated speech recognition system (e.g., a voice recognition application of the media delivery system 144) and receiving the text data 298 as output from the automated speech recognition system. Automated speech recognition can be performed using any of a variety of techniques (e.g., using hidden Markov models or neural networks). Examples of automated speech recognition systems include CMU SPHINX, maintained by CARNEGIE MELLON UNIVERSITY, and DEEPSPEECH, maintained by the MOZILLA FOUNDATION. After the text data 298 is obtained from the automated speech recognition system, the method 290 can move to operation 300. This is for example purposes only, and other configurations are possible. For instance, the voice-enabled device 102 or an external third party service can perform the automated speech recognition such that the media delivery system 144 receives the voice query as a text query comprised of the text data 298, and the method 290 begins at operation 300.

Operation 300 includes determining a slot 304 and an intent 302 from the text data 298. The slot 304 is a key-value pair that describes a portion of the text data 298 having a specific meaning. For example, the slot 304 may be a key-value pair identifying an artist, a song title, an album title, a playlist title, or other similar information associated with a media content item. Additionally, the slot 304 may be a key-value pair identifying descriptors associated with a media content item, such as a genre, a mood, an activity. The intent 302 describes a general intent of the text data 298. For example, the intent 302 may be to play media content items, search for media content items, or have media content items recommended. In the illustrated example of FIG. 3, if the text data 298 represents "play chill hits" as input, the intent 302 is "play" and the slot 304 can include at least one key-value pair, such as {descriptor: chill} and {descriptor: hits}. In another example, if the text data 298 includes "play Hello" as input, the intent 302 is "play" and the slot 304 is a key-value pair of {song: Hello}.

In some embodiments, the text data 298 can include a single slot 304 and a single intent 302. In other embodiments, the operation 300 can return a plurality of slots 304 and/or a plurality of intents 302 from the text data 298. In yet other embodiments, the text data 298 provides an intent 302 but no slot 304. For example, where the text data 298 is "play," the operation 300 can return the intent 302 being "play," but will not result in any slot 304 (e.g., the text data 298 does not include a description of what to play). In other examples, the text data 298 can include one or more slots 304 but no intent. For instance, where the text data 422 is "Hello by Adele," the operation 300 can result in two slots 304 (e.g., {Song: Hello} and {Artist: Adele}) but no intent 302 (e.g., the text data 298 does not include a description of what do to with the song and artist, such as search, play, or save).

As described herein, the text data 298 can include one or more descriptors. In some embodiments, the descriptors can include values of one or more of the slots 304 identified from the text data 298. In the illustrated example of FIG. 3, where the text data 298 includes "play chill hits" converted from the voice query, the values of the slots 304, such as "chill" and/or "hits," can be included as descriptors of the text data 298. In other embodiments, the descriptors of the text data 298 can include the value of the intent 302 (e.g., "play" in the above example). In yet other embodiments, the descriptors of the text data 298 can be identified in other methods.

In some embodiments, the operation 300 can be performed by a natural language understanding model that is trained to identify the slot 304 and intent 302 for the text data 298 provided as input. The natural language understanding model can be implemented in a variety of ways, including using a state vector machine or a conditional random fields model, among others. With the intent 302 and the slots 304 determined, the method 290 can move to operation 740.

Operation 306 includes determining one or more fulfillment strategies 308 using the slot 304 and the intent 302. The fulfillment strategies 308 are courses of action to be performed, including associated rules, to execute a command or service associated with the voice query, such as the intent 302 thereof. For example, a "play" fulfillment strategy describes rules that start the media stream service 180 and is assigned to a voice query with the intent 302 identified as a "play" intent. As described herein, the fulfillment strategies 308 can include rules that result in an immediate execution of a first command based on an interpretation of the voice query, provision of a set of selectable options that relate to and identify a refinement of the interpretation of the voice query, and an execution of a second command responsive to the refined interpretation of the voice query (e.g., based on a selection of one of options).

Once the fulfillment strategies 308 are determined, the fulfillment strategies 308 are then performed by the media delivery system 144. For example, where a fulfillment strategy determined is a play fulfillment strategy based on the intent 302, media content items associated with the determined slots 304 are identified and ranked based on a likelihood to satisfy the user's intent in providing the voice query VQ. In some embodiments, performance of the fulfillment strategy results in the determination of the interpretation of the voice query VQ. For example, the identified media content item ranked most likely to satisfy the user's intent represents the interpretation of the voice query VQ, and is provided to the voice-enabled device 102 for immediate playback. The remaining identified media content items represent alternative media content items that are also associated with the determined slots 304 and could also potentially satisfy the user's intent and thus, serve as refinements to the interpretation.

In some scenarios, the voice query VQ is less ambiguous and a determination is more easily made. For example, if the user U asks the voice enabled device 102 to "play Back in Black by ACDC", the corresponding intent 302 of "play" and slots 304 {Song: Back in Black} and {Artist: ACDC} will cause the voice query interpretation refinement engine 114 to determine media content items associated with the identified song and artist, where the song Back in Black is ranked as most likely to satisfy the user's intent and is provided as the media content item for immediate playback.

In other scenarios, the voice query VQ is more ambiguous and the determination may result in a wide variety of media content items that are responsive. For example, if the user U asks the voice enabled device 102 to "play hello", an intent 302 of "play" and a variety of slots 304 (e.g., {Song: hello}, {Album: hello}, {Artist: hello}, {podcast: hello}) are determined. In some embodiments, the voice query interpretation refinement engine 114 can strategically analyze each of the slots 304 to determine whether media content items associated with the slot 304 are likely to satisfy the user's intent. For example, the voice query interpretation refinement engine 114 first tries to identify any media content items that are songs titled "hello". If no match is found, then the voice query interpretation refinement engine 114 can next try to identify any media content items that are albums titled "hello", and so forth.

In some embodiments, the media content items can be determined and ranked based on individual preferences and tastes of the user U, such as based at least in part on a user profile of an account associated with the voice-enabled device 102 (e.g., the user's account profile). For example, a media content item selected by the user in response to a previously received voice query similar to the voice query VQ can be included and ranked highly within a list of the N-best media content items. As a further example, media content items that are determined to likely satisfy the user's intent in providing the voice query VQ and are frequently requested by and/or listened to by the user U, or that have a musical profile that is similar to a user's musical taste profile, can be included and ranked highly within the list of the N-best media content items. Similarly, a query that the user U has never requested or media content items that have not been listened to in the past or that do not match the user's music taste profile could be ranked lower or not included in the ranking of N-best media content items.

In other embodiments, the determination and ranking of media content items can be collectively based on data associated with a plurality of account profiles (e.g., popularity data). For example, media content items that have been requested, listened to, and/or favorited by a large number of other users in response to similar queries can be included and ranked high within the N-best media content items. In further embodiments, the determination and ranking of media content items can be both individually based on a specific user's account profile and collectively based on popularity data, or other factors.

As previously discussed, the remaining identified media content items represent alternative media content items that are also associated with the determined slots 304 and could also potentially satisfy the user's intent and thus, serve as refinements to the interpretation. Accordingly, the remaining media content items can then be used to generate the set of selectable options 120, where each option is associated with one of the remaining media content items and identifies a refinement of the interpretation of the voice query. The voice query interpretation refinement engine 114 provides instructions to the GUI-capable device 106 to prompt the generation and display of the graphical user interface 118 comprising the set of selectable options 120 at the GUI-capable device 106. Upon selection of one of the selectable options 120 at the GUI-capable device 106, the voice query interpretation refinement engine 114 identifies the alternative media content item associated with selected option and provides the identified alternative media content item to the voice-enabled device 102 for playback.

Additional detail are disclosed in U.S. patent application Ser. No. 16/227,996, titled SYSTEMS AND METHODS FOR IMPROVING FULFILLMENT OF MEDIA CONTENT RELATED REQUESTS VIA UTTERANCE-BASED HUMAN-MACHINE INTERFACES, filed Dec. 20, 2018, the disclosure of which is hereby incorporated by reference in its entirety for all purposes and specifically for description of the determination of the fulfillment strategies 308.

Figure 8:
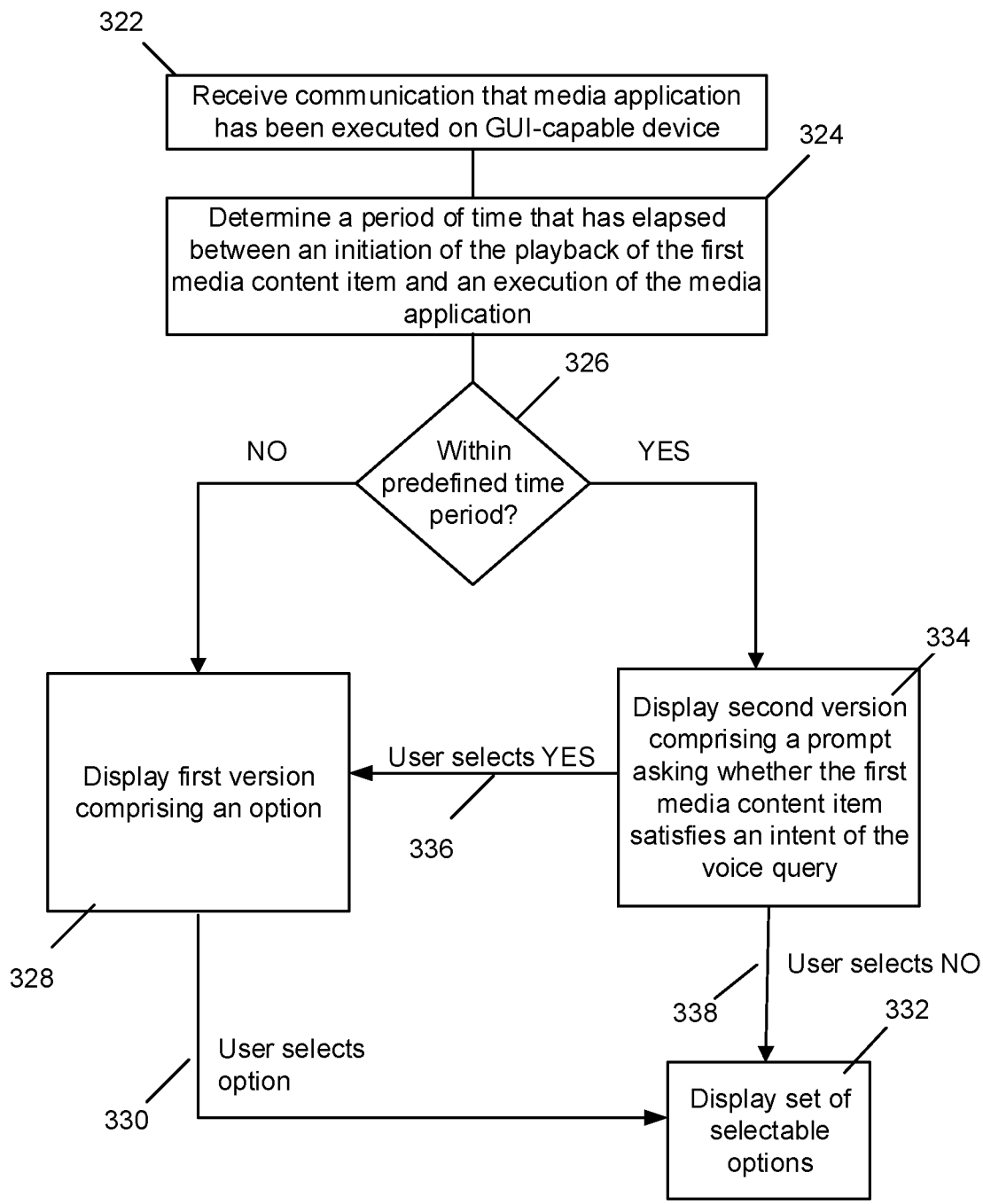
FIG. 8 is a flow diagram illustrating generation and display of alternative versions of a graphical user interface.

FIG. 8 is a flow diagram 320 illustrating generation and display of alternative versions of a graphical user interface. In some embodiments, different versions of the graphical user interface 118 are generated and displayed based on a period of time that has elapsed between the initiation of the playback of the first media content item T1 on the voice-enabled device 102 and the execution of the media application 150 at the GUI-capable device 106. For example, there is a predefined time period that is set as a threshold. In some examples, the predetermined time period correlates to a likely time period within which the user, after beginning to listen to the first media content item T1, would open up the media application 150 on the GUI-capable device 106 with the intent to change the playback. In one embodiment, the predetermined time period is five minutes.

As shown in FIG. 8, at operation 322 the voice query interpretation refinement engine 114 can receive a communication (e.g., communication 202 described in FIG. 4) indicating that the media application 150 has been executed at the GUI-capable device 106. At operation 324, a period of time that has elapsed between the initiation of the playback of the first media content item T1 and the execution of the media application 150 can be determined. At decision 326, a decision is made as to whether the period of time elapsed determined at operation 324 is within the predefined time period (e.g., is below the threshold).

Figure 9:
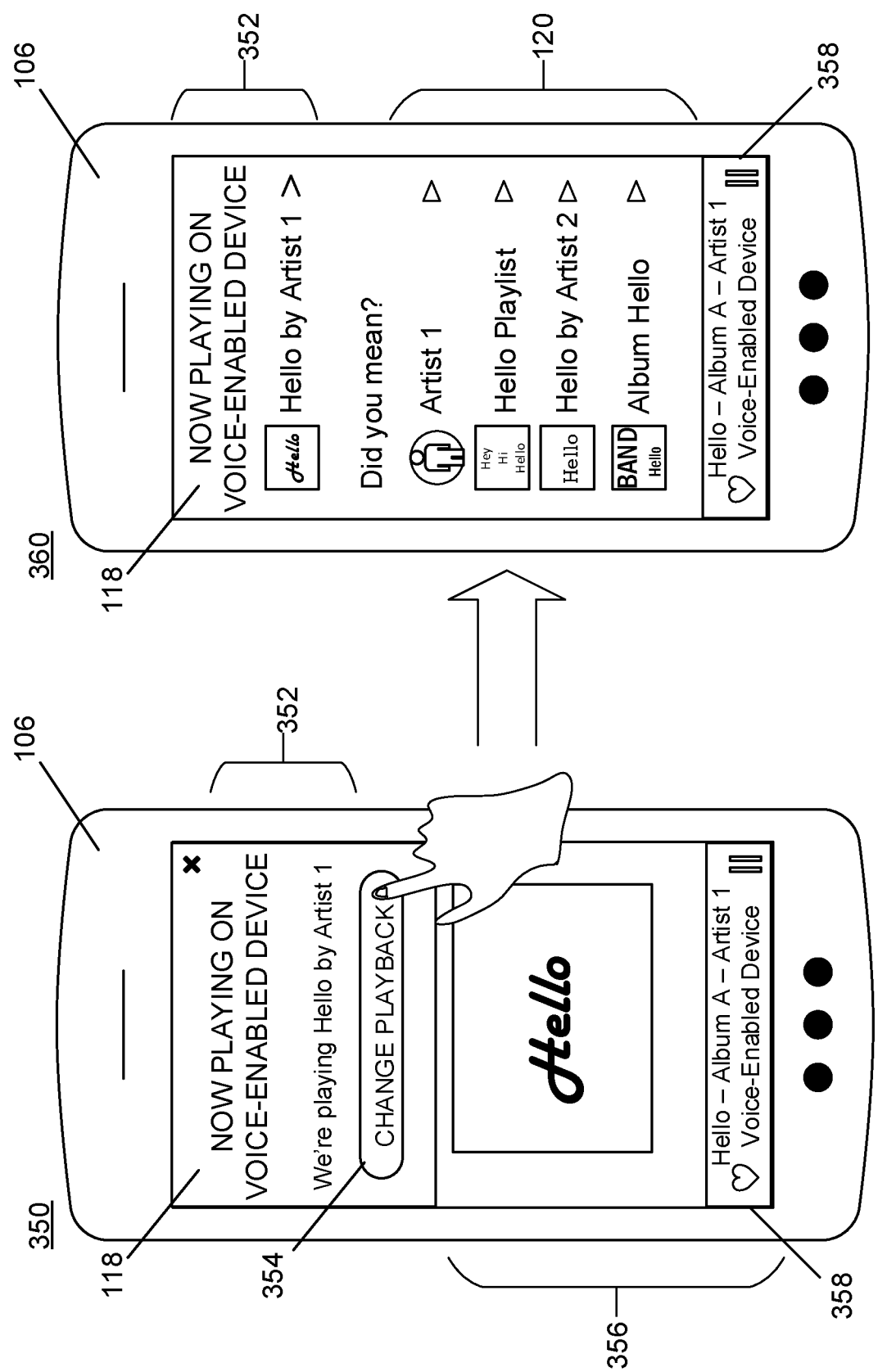
FIG. 9 illustrates an example graphical user interface.

If the elapsed time period determined at operation 324 is not within the predefined time period or is above the threshold, then, at operation 328, a first version of the graphical user interface 118 comprising an option is generated and displayed at the GUI-capable device 106. In some examples, the option is an option to change the playback on the voice-enabled device 102, as illustrated in FIG. 9. If, at operation 330, the user U selects the option to change the playback on the first version of the graphical user interface, the set of selectable options is displayed within the graphical user interface 118 at operation 332.

Figure 10:
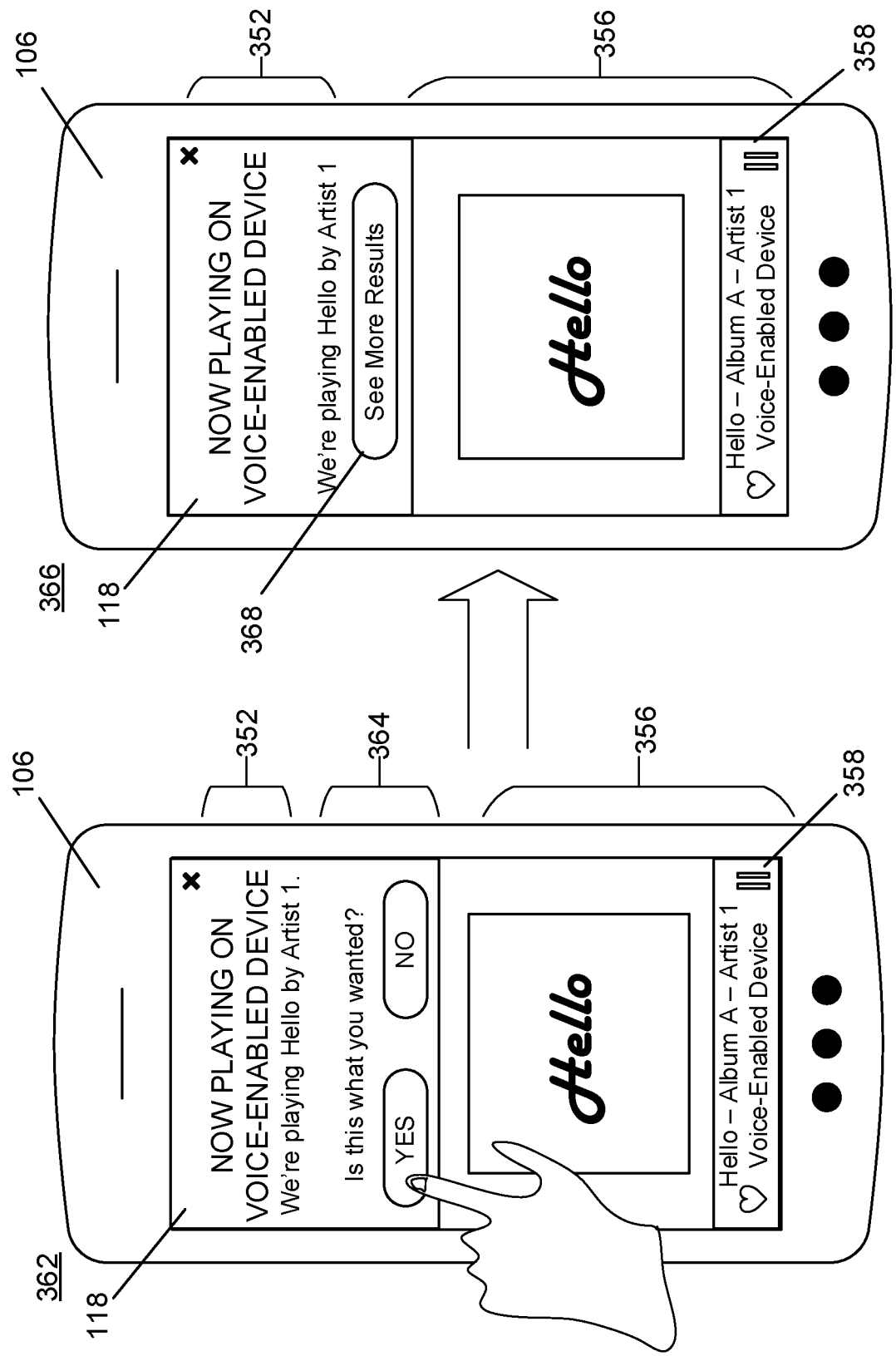
FIG. 10 illustrates another example graphical user interface.

If the elapsed time period determined at operation 324 is within the predefined time period or is below the threshold, then, at operation 334, a second version of the graphical user interface 118 is displayed. The second version displays a prompt asking the user U whether the first media content item satisfies the user's intent in providing the voice query. Examples of the second version are illustrated in FIGS. 10 and 11.

If, at operation 336, the user U selects that the first media content item satisfies the user's intent in providing the voice query, then the first version of the graphical user interface 118 comprising an option is displayed at operation 328. In some examples, the option is an option to see more results responsive to the voice query VQ on the voice-enabled device 102, as illustrated in FIG. 10. If, at operation 330, the user U selects the option to see more results on the first version of the graphical user interface, the set of selectable options is displayed within the graphical user interface 118 at operation 332.

Figure 11:
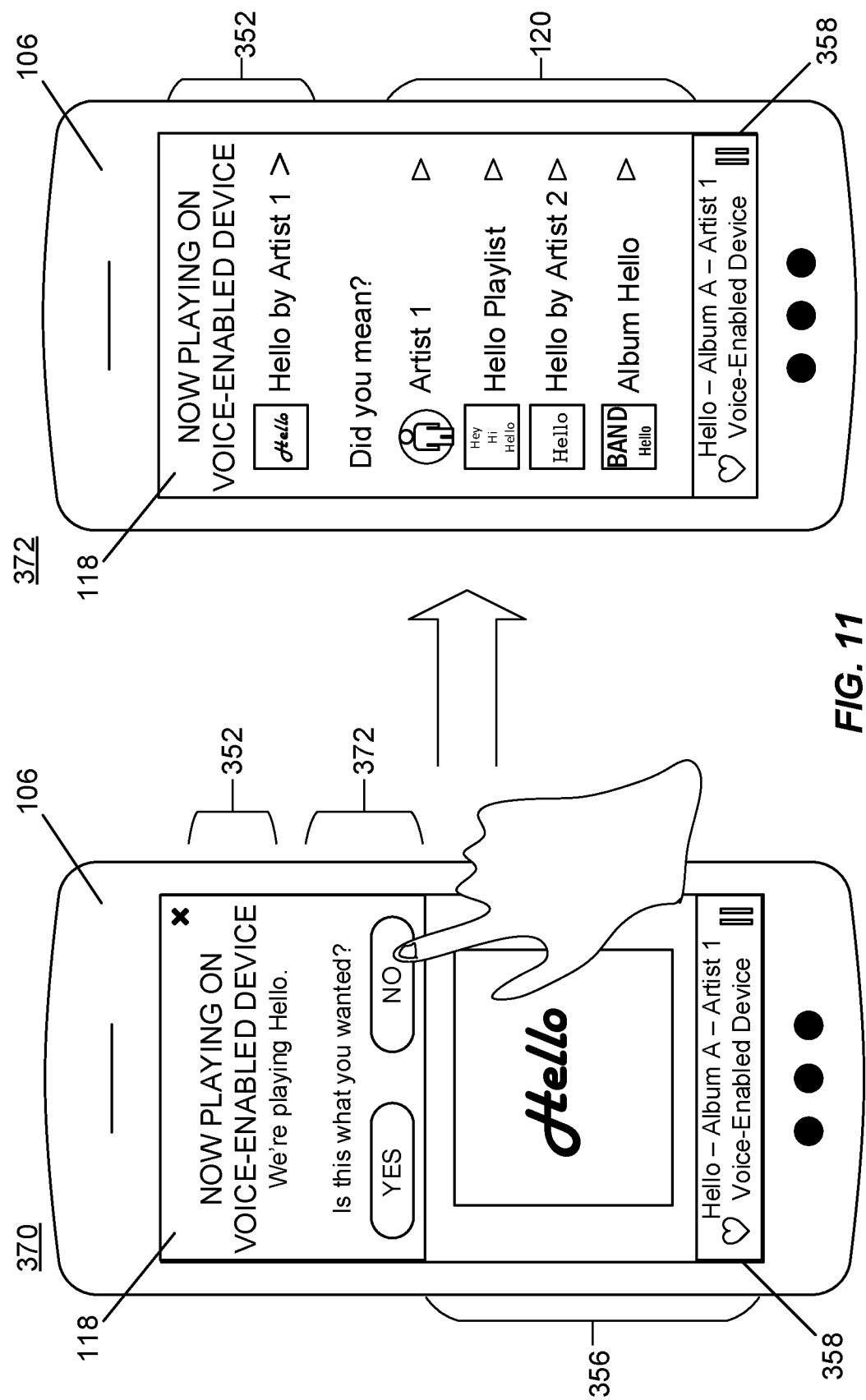
FIG. 11 illustrates another example graphical user interface.

If, at operation 338, the user U selects that the first media content item does not satisfy the user's intent in providing the voice query, then the set of selectable options is displayed within the graphical user interface 118 at operation 332, as illustrated in FIG. 11.

In other embodiments, the elapsed time period between the initiation of the playback of the first media content item T1 on the voice-enabled device 102 and the execution of the media application 150 at the GUI-capable device 106 does not affect which version of the graphical user interface 118 is provided. For example, regardless of the elapsed time period, the first version of the graphical user interface 118 is provided. Alternatively, regardless of the elapsed time period, the second version of the graphical user interface 118 is provided.

In yet further embodiments, the provision of the instructions from the voice query interpretation refinement engine 114 to the GUI-capable device 106 is not dependent on the media application 150 first executing at the GUI-capable device 106. Rather, the instructions can be provided to the GUI-capable device 106 following and/or in conjunction with the provision of the first media content item T1 to the voice-enabled device 102. In such an embodiment, either the first version or the second version the graphical user interface 118 can be generated and displayed upon selection of a pop up notification, for example. In some examples, the pop up notification is associated with the media application 150.

FIGS. 9, 10, and 11 illustrate example graphical user interfaces 118. In some embodiments, the graphical user interface 118 is generated and displayed at the GUI-capable device 106 by the GUI generation engine 116 in response to instructions received from the voice query interpretation refinement engine 114 of the media delivery system 144. Additionally, in some examples, each version of the graphical user interface 118 that is generated and displayed corresponds to the operations within the flow diagram 320 as described in FIG. 8.

To provide an example scenario for use in the following discussion of FIGS. 9, 10 and 11, the user U provides "play hello" as a voice query VQ to the voice-enabled device 102. When providing the voice query VQ, the user U may have a particular intent. For example, when the user U asks the voice-enabled device 102 to "play hello" he or she likely intends for a specific type of media content item to be played back. The voice query interpretation refinement engine 114 identifies "Hello," a song by artist 1, as the first media content item T1 responsive to the voice query VQ (e.g., "Hello", a song by artist 1 is the determined interpretation of the voice query VQ, and provides "Hello" to the voice-enabled device 102 for playback.

In some scenarios, "Hello", the song by artist 1, satisfies the user's intent in providing the voice query VQ. In other scenarios, the ambiguity of the voice query VQ (e.g., the fact that there are many possible options as to what the user might be asking for, such as to play a song titled "hello," a podcast titled "hello," or a song or album by the band named "hello") leads to the identification and provision of "Hello", the song by artist 1, not satisfying the user's intent. Enabling refinement of the interpretation of the voice query VQ at the voice query interpretation refinement engine 114 through generation and display of the graphical user interface 118 at the GUI-capable device 106 can help achieve satisfaction of the user's intent.

In one embodiment, the user U selects to open the media application 150. In response to the execution of the media application 150, the voice query interpretation refinement engine 114 provides instructions for generation and display of the graphical user interface 118 to the GUI-capable device 106. The GUI generation engine 116 can then generate and display the graphical user interface 118 based on the received instructions.

Alternatively, in another embodiment, the instructions can be provided to the GUI-capable device 106 following and/or in conjunction with the provision of the first media content item T1 to the voice-enabled device 102. A push notification associated with the media application 150, for example, can be provided at the GUI-capable device 106, and in response to a user selection of the push notification, the GUI generation engine 116 can generate and display the graphical user interface 118 based on the received instructions.

In FIG. 9, the graphical user interface 118 includes a display 350 on the left and an updated display 360 on the right. In some embodiments, the display 350 may be an example of the first version of the graphical user interface 118, and display thereof corresponds to the performance of operation 328 described in FIG. 8. For example, if an elapsed time period between the initiation of the playback of "Hello" on the voice-enabled device 102 and the execution of the media application 150 is not within the predefined time period or is above the threshold, then the display 350 is presented within the graphical user interface 118.

The display 350 includes a notification 352 to inform the user U which media content item is currently playing back on the voice-enabled device. For example, the notification can notify the user that "Hello by Artist 1" is playing on the voice-enabled device 102. The first version 350 also includes information 356 associated with the first media content item T1 that is currently playing on the voice-enabled device 102. Dependent on a type of the media content item currently playing, the information 356 can include a song title, an album title, an artist, and associated graphics such as an image of the artist, an album cover, or other similar graphical image. Some of the information 356 can also be incorporated into a control panel 358 that enables pausing of the playback and/or favoriting of the media content item, among other examples.

The display 350 further includes an option 354 to change the playback on the voice-enabled device 102. Corresponding to the performance of operations 330 and 332 described in FIG. 8, if the user U selects the option 354 to change the playback, the updated display 360 is presented within the graphical user interface 118. The updated display 360 can include the set of selectable options 120. In addition to the set of selectable options 120, the updated display 360 can maintain the notification 352 and the control panel 358. In some examples, the user U can select text and/or graphics within the notification 352, and additional information about the media content item that is currently playing back on the voice-enabled device is provided.

In some embodiments, the set of selectable options 120 refine the interpretation of the voice query VQ at the voice query interpretation refinement engine 114. In one example, the selectable options represent alternative media content items that could potentially satisfy the user's intent in providing the voice query VQ "play hello." For example, the set of selectable options could include the artist 1, a playlist titled "Hello," a song "Hello" by artist 2, and album titled "Hello." The set of selectable options 120 can be formatted for display in a list as shown, or alternatively can be formatted for display as a table or other visual array that is easily consumable by the user U. Based on a number of options and a size of the display screen on the GUI-capable device 106, the set of selectable options 120 can be scrollable. In some embodiments, the options within the set of selectable options 120 are ordered based on their likelihood of satisfying the intent of the voice query VQ. For example, the option artist 1 is more likely to satisfy the intent over the playlist titled "Hello," the song "Hello" by artist 2, and the album titled "Hello."

Additionally, the set of selectable options 120 can comprise a combination of textual and graphical content. For example, in addition to text identifying a particular artist, song, playlist, or album, associated graphics such as an image of the artist, an album cover, or other similar graphical image can be displayed. In further embodiments, additional information about each option within the set of selectable options 120 can be provided upon a user selection of the respective option.

In FIG. 10, the graphical user interface 118 includes a display 362 on the left and an updated display 366 on the right. In some embodiments, the display 362 may be an example of the second version of the graphical user interface 118, and display thereof corresponds to the performance of operation 334 described in FIG. 8. If the elapsed time period between the initiation of the playback of "Hello" on the voice-enabled device 102 and the execution of the media application 150 is within the predefined time period or is below the threshold, then the display 362 is presented within the graphical user interface 118.

Similar to the display 350 described in FIG. 9, the display 362 includes the notification 352, the information 356 associated with the first media content item T1 that is currently playing on the voice-enabled device 102, and the control panel 358.

However, unlike the display 350, the display 362 includes a prompt 364 asking the user U whether the first media content item satisfies the user's intent in providing the voice query VQ. Corresponding to operations 336 and 328 described in FIG. 8, if the user U selects "yes" in response to the prompt 364, the updated display 366 is presented within the graphical user interface 118. The updated display 366 can be similar to the display 350 described in FIG. 9. For example, the updated display 366 can include the notification 352, the information 356 associated with the first media content item T1 that is currently playing on the voice-enabled device 102, and the control panel 358. Additionally, the updated display 366 further includes an option 368 to see more results responsive to the voice query VQ.

Corresponding to operations 330 and 332 described in FIG. 8, if the user U then selects the option 368 to see more results, a display similar to the updated display 360 described in FIG. 9 is presented within the graphical user interface 118.

In FIG. 11, the graphical user interface 118 includes a display 370 on the left and an updated display 372 on the right. The display 370, similar to display 362 in FIG. 10, may be an example of the second version of the graphical user interface 118 that includes the prompt 364 asking the user U whether the first media content item satisfies the user's intent in providing the voice query VQ. Corresponding to operations 338 and 332 described in FIG. 8, if the user U selects "no" in response to the prompt 364, the updated display 372 is presented within the graphical user interface 118. The updated display 372 can be similar to the updated display 360 described in FIG. 9. For example, the updated display includes the set of selectable options 120, the notification 352, and the control panel 358.

The example graphical user interfaces provided above in FIGS. 9, 10, and 11 are for illustrative purposes only, and are not intended to be limiting. Additional or alternative textual schemes, graphical schemes, audio schemes, animation schemes, coloring schemes, highlighting schemes, and/or shading schemes may be utilized to enhance the display within the graphical user interfaces.

Figure 12:
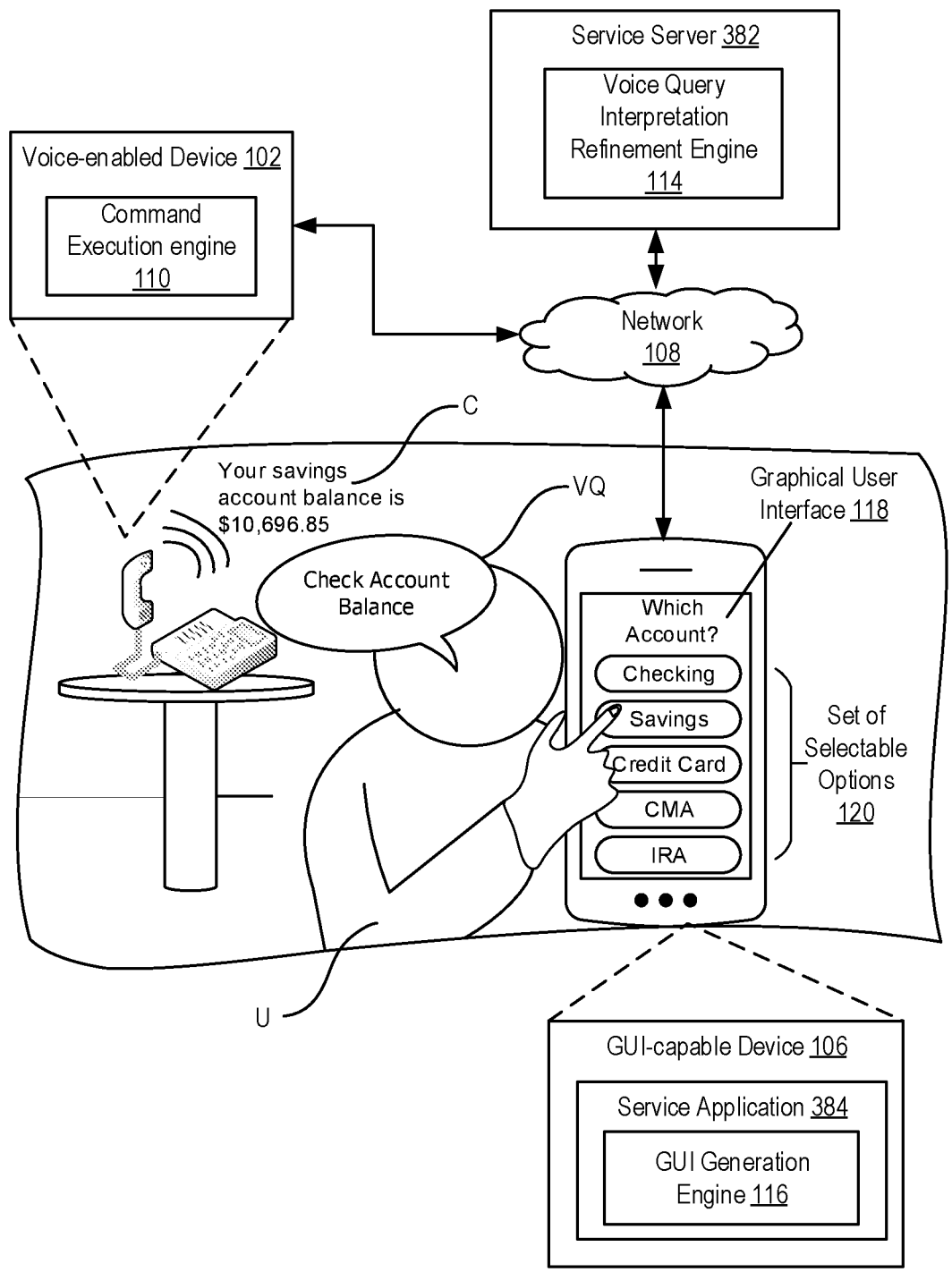
FIG. 12 illustrates an example automated telephone system.

FIG. 12 illustrates an example automated telephone system 380. The automated telephone system 380 is an example of the voice interaction system 100, shown in FIG. 1. In this example, the automated telephone system 380 is associated with a banking service and includes the voice-enabled device 102, a service server 382, and the GUI-capable device 106. In this example, the voice-enabled device 102 includes a command execution engine 110, the service server 382 includes the voice query interpretation refinement engine 114, and the GUI-capable device 106 includes a service application 384 and the GUI generation engine 116. The automated telephone system 380 communicates across the network 108. Also shown is the user U who interacts with the automated telephone system 380.

In some embodiments, the voice-enabled device 102 is a computing device comprising a voice user interface (VUI). The VUI allows the user U to interact with the voice-enabled device 102 by providing voice input. However, the voice-enabled device 102 lacks a graphical user interface with which the user U can efficiently interact with and/or control the voice-enabled device 102 via touch input, pen or stylus input, and/or other traditional methods of input (e.g., keyboard and mouse input).

In FIG. 12, the example voice-enabled device 102 includes a combination of a telephone through which the user U places a call via a communication channel to the banking service and an automated telephone service associated with the banking service. The automated telephone service includes one or more computing devices and associated software programs that are capable of answering calls received via one or more communication channels and are capable of interacting with customers such as user U. For example, the automated telephone service can prompt users to provide input (e.g., press a button or speak a response) to determine what the users are calling about. Depending on the input received, the automated telephone service can play some information over the communication channel to be output by the telephone speaker, route the caller to another prompt or connect the caller with a human operator, among other similar examples.

The voice-enabled device 102 operates to receive the voice query VQ from the user U and execute a command responsive to the voice query VQ. For example, the user U can ask the voice-enabled device 102 to "check account balance." The command execution engine 110 can then generate audio output associated with the executed command using an audio output device (e.g., a speaker) therein.

In some embodiments, the service server 382 is a server associated with the banking service and operates to determine an interpretation of the voice query VQ to determine and provide commands responsive to the voice query VQ to the voice-enabled device 102 for execution. Additionally, in other embodiments, the service server 382 operates to provide instructions to the GUI-capable device 106 for generating and displaying the graphical user interface 118. In some embodiments, the service server 382 is connectable to a plurality of voice-enabled devices 102 and provides commands to the voice-enabled devices 102 independently or simultaneously. Similarly, in some embodiments, the service server 382 is connectable to a plurality of GUI-capable devices 106 and provides instructions for the generation and display of the graphical user interface 118 to the GUI-capable devices 106 independently or simultaneously. The service server 382 comprises a media server 146 and a voice query interpretation refinement server 148.

The voice query interpretation refinement engine 114 operates to receive the voice query VQ from the voice-enabled device 102 over the network 108, determine an interpretation of the voice query VQ, and determine commands responsive to the voice query VQ based on the interpretation. Using speech recognition, the voice query VQ is processed into a text query, suitable for media content search at the service server 382. In some embodiments, the processing is performed by the voice-enabled device 102 or an external third party service. In other embodiments, the processing is performed at the service server 382 by the voice query interpretation refinement engine 114 or a separate speech processing application of the service server 382.

The voice query interpretation refinement engine 114 interprets the voice query VQ and determines which commands are responsive to the voice query VQ based on the interpretation. In this embodiment, a goal of the interpretation is to satisfy an intent of the user U in providing the voice query VQ. For example, the user U has five different accounts with the banking service, and thus a check account balance command for each of the five accounts are determined to be responsive to "check account balance" (e.g., five commands total) based on the interpretation. However, it is likely that the user U really only wants to check one of the accounts, and it would be extremely inefficient and likely frustrating to the user to have the voice-enabled device provide account balances of each of the five accounts.

To avoid these inefficiencies and frustrations, the commands determined to be responsive to the voice query VQ can be used to generate a set of selectable options 120. The set of selectable options 120 identify a refinement of the interpretation of the voice query, such as a specific account the user U is referring to in the voice query VQ "check account balance." For example, each selection option identifies one of the five accounts based on a type of the account, such as "checking," "savings," "credit card," "CMA," and "IRA." In some examples, one or more of the options can also include selectable sub-options.

Optionally, an initial command most likely to satisfy the user's intent in providing the voice query VQ is immediately provided to the voice-enabled device 102 for execution. For example, if the user U more frequently checks the balance of the savings account over the other accounts, a check savings account balance command can be provided to the voice-enabled device 102 for initial execution. The set of selectable options 120 are then generated to identify the remaining four accounts, and included as part of the instructions.

In other embodiments, the voice query interpretation refinement engine 114 provides the instructions to the GUI-capable device 106 for generating and displaying the graphical user interface 118 immediately upon determining the responsive commands and generating the set of selectable options. In other embodiments, the voice query interpretation refinement engine 114 provides the instructions to the GUI-capable device 106 in response to a determination that the service application 384 is executed on the GUI-capable device 106 (e.g., the user U opens the service application 384).

If the user U selects one of the selectable options, the voice query interpretation refinement engine 114 can receive the selection from the GUI-capable device 106, identify a command C associated with the selected option, and provide the voice-enabled device 102 with the identified command C for execution on the voice-enabled device 102. For example, the user U selects "savings," the voice query interpretation refinement engine 114 receives the selection and identifies the check savings account balance command associated with the selected "savings" option. The check savings account balance command is provided to the voice-enabled device 102 for execution. For example, the voice-enabled device 102 can generate audio output indicating "Your savings account balance is $10,696.85."

If the user had two savings accounts, such as one for everyday savings and one for upcoming vacations, in some embodiments, a set of selectable sub-options would be displayed in the graphical user interface 118 in response to the user U selecting "savings." Upon selection of one of the two accounts by the user U, the voice query interpretation refinement engine 114 can receive the selection, identify the associated command associated with the selected sub-option, and provide the identified command to the voice-enabled device 102 for execution.

In some embodiments, the GUI-capable device 106 is a computing device, such as a smartphone, a tablet, a wearable computing device, a laptop, or a desktop computer, that has the capability to generate and display graphical user interfaces, such as the graphical user interface 118. In other embodiments, the GUI-capable device 106 is a component of the voice-enabled device 102. For example, the user U can place the call to the banking service through the GUI-capable device 106.

In this embodiment, the GUI-capable device 106 operates to execute one of a thick or a thin version of the service application 384 in response to receiving an execute command from the user U. In some examples, the service application 384, similar to the service server 382, is associated with the banking service. In some embodiments, the service application 384 comprises the GUI generation engine 116. In other embodiments, the GUI generation engine 116 is a separate component of the GUI-capable device 106 that is communicatively coupled to the service application 384.

In this embodiment, the GUI generation engine 116 operates to receive instructions from the voice query interpretation refinement engine 114 and generate the graphical user interface 118 for display based on the received instructions. In some examples, the graphical user interface 118 is displayed as a user interface of the service application 384. As previously described, the graphical user interface 118 includes the set of selectable options 120. Through the selection of an option within the set of selectable options 120, the user U can refine the interpretation of the voice query VQ at the voice query interpretation refinement engine 114 and correspondingly control the command executed at the voice-enabled device 102. The user U can interact with the GUI-capable device and associated graphical user interface 118 by providing one or more of touch input, pen or stylus input, and/or other traditional methods of input (e.g., keyboard and mouse input) depending on a type of the GUI-capable device 106.

Figure 13:
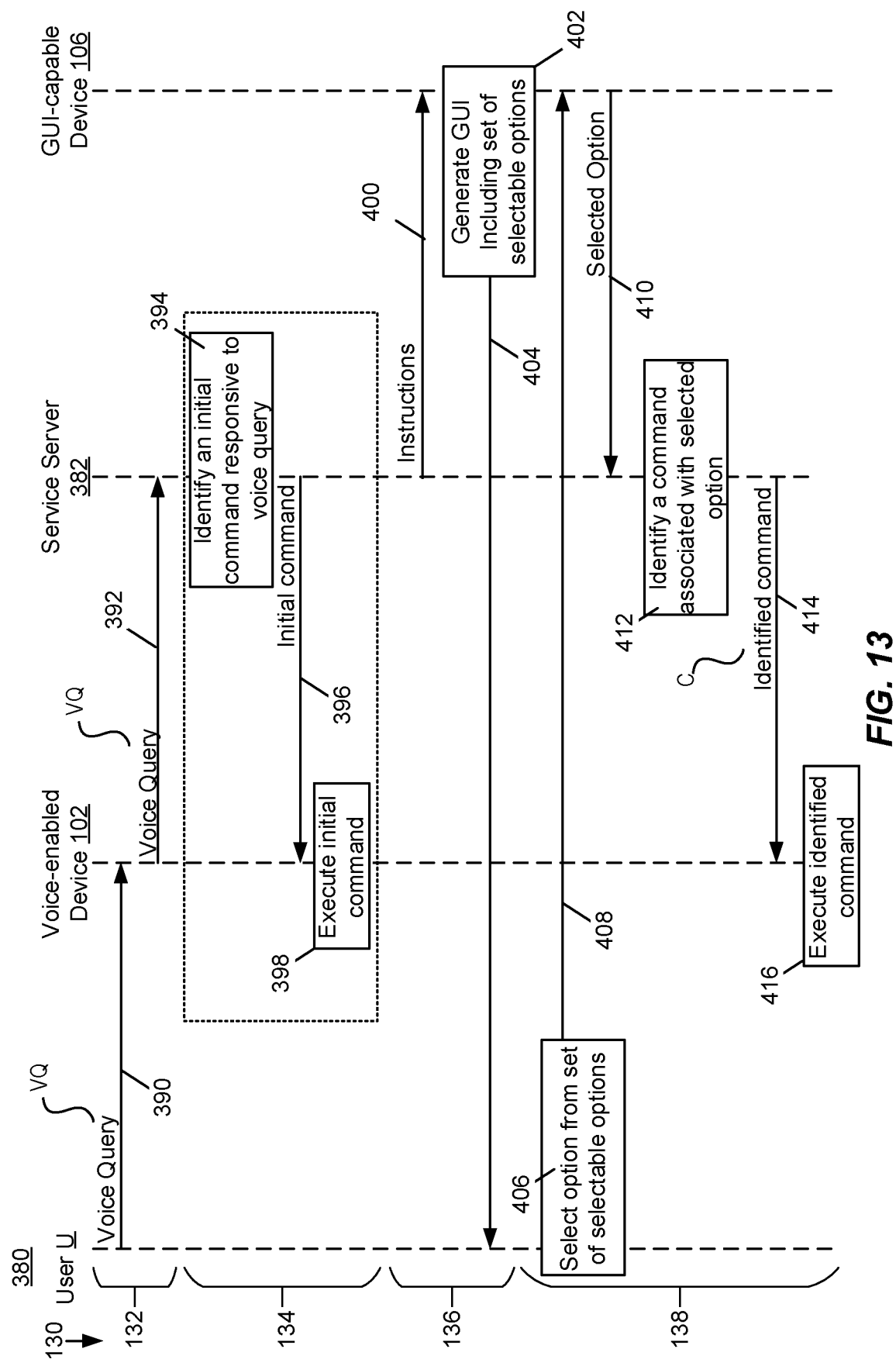
FIG. 13 is a communication diagram illustrating interactions between components of an example automated telephone system.

FIG. 13 is a communication diagram illustrating interactions between components of an example automated telephone system 380, and illustrates an example of the method 130 for refining an interpretation of a voice query as previously described with reference to FIG. 2. As previously described with reference to FIG. 12, the example automated telephone system 380 includes the voice-enabled device 102, the service server 382, the GUI-capable device 106, and the network 108. Also shown is the user U who interacts with the automated telephone system 380.

In some embodiments, the components of the automated telephone system 380 interact to perform the example method 130 for refining an interpretation of a voice query as described in FIG. 2. For example, operations 390 and 392 can be used to at least partially perform the operation 132. The voice-enabled device 102 receives the voice query VQ from the user U at operation 390, and provides the voice query VQ to the service server 382 at operation 392.

Optionally, in other embodiments, operations 394, 396, and 398 can be used to at least partially perform the optional operation 134. For example, the service server 382 can identify an initial command responsive to the voice query VQ at operation 394. In some embodiments, the initial command represents the determined interpretation of the voice query VQ and can be identified by determining N-best commands responsive to the voice query VQ, ranking the N-best commands based on a likelihood each command satisfies the user's intent in providing the voice query VQ, and determining the highest ranked N-best command is the initial command. In some examples, the N-best commands can be determined and ranked based on one or more of a profile history of an account associated with the voice-enabled device 102 and data associated with a plurality of account profiles. The service server 382 can provide the initial command to the voice-enabled device 102 for execution at operation 396. At operation 398, the voice-enabled device 102 can then generates audio output using a media output device (e.g., a speaker) therein to execute the initial command.

In further embodiments, operations 400, 402, and 404 can be used to at least partially perform the operation 136. For example, at operation 400, the service server 382 can provide instructions to the GUI-capable device 106 for generating and displaying the graphical user interface 118. Based on the instructions, the GUI-capable device 106 can generate the graphical user interface 118 at operation 402. In some embodiments, the graphical user interface 118 includes the set of selectable options 120 that relate to and identify refinement of the interpretation of the voice query VQ. In some examples, the set of selectable options 120 can be generated based on the remaining N-best commands. The graphical user interface 118 is then displayed to the user at operation 404.

In yet further embodiments, operations 406, 408, 410, 412, 414 and 416 can be used to at least partially perform the operation 138. For example, if the user U selects one of the selectable options at operation 406, the GUI-capable device can detect the selected option at operation 408, and provide the selected option to the service server 382 at operation 410. The service server 382 can then identify a command C associated with the selected option at operation 412, and provide the identified command C to the voice-enabled device 102 at operation 414. Upon receipt of the identified command C from the service server 382, the voice-enabled device 102 can generates audio output associated with the identified command C to execute the identified command C at operation 416.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A server for refining an interpretation of a voice query, the server comprising:
   at least one processing device; and
   memory coupled to the at least one processing device and storing instructions, which when executed by the at least one processing device, cause the at least one processing device to:
      receive, from a first device, a voice query requesting execution of a command by the first device;
      determine an interpretation of the voice query;
      provide instructions to a second device for generating and displaying a graphical user interface at the second device, the graphical user interface including a set of one or more selectable options, each of the one or more selectable options relating to the voice query and identifying a refinement of the interpretation of the voice query;
      receive, from the second device, an indication of a selection of one of the one or more selectable options from the set in the graphical user interface displayed at the second device; and
      cause a command associated with the selected option to be executed by the first device.

2. The server of claim 1, wherein the at least one processing device is further caused to:
   generate the set of one or more selectable options by identifying a plurality of commands that could satisfy an intent of a user in providing the voice query, wherein a selectable option is generated for one or more of the plurality of commands.

3. The server of claim 1, wherein upon receipt of the voice query from the first device, the at least one processing device is further caused to:
   determine an initial command responsive to the voice query based on the interpretation of the voice query;
   cause the initial command to be executed by the first device; and while the initial command is being executed, provide the instructions for generating and displaying the graphical user interface to the second device.

4. The server of claim 3, wherein to determine the initial command, the at least one processing device is caused to:
    determine N-best commands responsive to the voice query based on the interpretation;
    rank the N-best commands based on a likelihood that each satisfy an intent of a user providing the voice query; and
    determine a highest ranked command from the N-best commands as the initial command.

5. The server of claim 4, wherein the N-best commands are further determined based on one or more of a profile history of an account associated with the first device and data associated with a plurality of account profiles.

6. The server of claim 4, wherein the at least one processing device is further caused to:
    generate the set of one or more selectable options based on remaining N-best commands, the remaining N-best commands representing alternative commands to the initial command that could satisfy the intent of the user providing the voice query, wherein a selectable option is generated for one or more of the alternative commands.

7. The server of claim 1, wherein the selected option includes a set of one or more selectable sub-options, and the at least one processing device is further caused to:
    in response to receiving, from the second device, the indication of the selected option, causing the set of one or more selectable sub-options to be displayed in the graphical user interface displayed at the second device, each of the one or more selectable sub-options in the set identifying a further refinement of the interpretation of the voice query;
    receive, from the second device, an indication of a selection of one of the one or more selectable sub-options from the set in the graphical user interface displayed at the second device; and
    cause a command associated with the selected sub-option to be executed by the first device.

8. The server of claim 1, wherein the instructions are provided to the second device in response to an execution of an application associated with the server at the second device.

9. The server of claim 1, wherein the first device lacks a capability to display the graphical user interface.

10. The server of claim 1, wherein the server is a media server of a media delivery system.

11. The server of claim 1, wherein the server is a service server of an automated telephone system.

12. Computer readable storage media storing instructions that, when executed by at least one processing device, cause the at least one processing device to:
    receive, from a first device, a voice query requesting execution of a command by the first device;
    determine an interpretation of the voice query;
    provide instructions to a second device for generating and displaying a graphical user interface at the second device, the graphical user interface including a set of one or more selectable options, each of the one or more selectable options relating to the voice query and identifying a refinement of the interpretation of the voice query;
    receive, from the second device, an indication of a selection of one of the one or more selectable options from the set in the graphical user interface displayed at the second device; and
    cause a command associated with the selected option to be executed by the first device.

13. The computer readable storage media of claim 12, wherein the at least one processing device is further caused to:
    determine N-best commands responsive to the voice query based on the interpretation; and
    rank the N-best commands based on a likelihood that each satisfy an intent of a user providing the voice query.

14. The computer readable storage media of claim 13, wherein the N-best commands are further determined based on one or more of a profile history of an account associated with the first device and data associated with a plurality of account profiles.

15. The computer readable storage media of claim 13, wherein the at least one processing device is further caused to:
    generate the set of one or more selectable options to include one or more of the N-best commands.

16. The computer readable storage media of claim 15, wherein the one or more selectable options are ordered in the set based on the rank of the one or more of the N-best commands.

17. The computer readable storage media of claim 13, wherein upon receipt of the voice query from the first device the at least one processing device is further caused to:
    determine a highest ranked command from the N-best commands as an initial command responsive to the voice query based on the interpretation of the voice query;
    cause the initial command to be executed by the first device; and
    while the initial command is being executed, provide the instructions for generating and displaying the graphical user interface to the second device.

18. The computer readable storage media of claim 17, wherein the at least one processing device is further caused to:
    generate the set of one or more selectable options to include one or more remaining N-best commands, the remaining N-best commands representing alternative commands to the initial command that could satisfy the intent of the user providing the voice query.

19. The computer readable storage media of claim 18, wherein the one or more selectable options are ordered in the set based on the rank of the one or more remaining N-best commands.

20. A device for facilitating refinement of an interpretation of a voice query, the device comprising:
    a display;
    at least one processing device; and
    memory coupled to the at least one processing device and storing instructions, that when executed by the at least one processing device, cause the at least one processing device to:
        receive, from a server, instructions for generating and displaying a graphical user interface;
        generate the graphical user interface based on the instructions;
        render the graphical user interface in the display, the graphical user interface including at least a set of one or more selectable options, each of the one or more selectable options relating to a voice query received at another device and identifying a refinement of an interpretation of the voice query made by the server;

detect a selection of one of the one or more selectable options; and provide the selected option to the server such that the server causes a command associated with the selected option to be executed by the other device.

\* \* \* \* \*